United States Patent
Zhang et al.

(10) Patent No.: US 10,320,459 B2
(45) Date of Patent: Jun. 11, 2019

(54) METHOD AND APPARATUS FOR MITIGATING INTERFERENCE IN A WIRELESS NETWORK THROUGH USE OF TRANSMIT BEAMFORMING

(71) Applicant: MARVELL WORLD TRADE LTD., St. Michael (BB)

(72) Inventors: Hongyuan Zhang, Fremont, CA (US); Rohit U. Nabar, Sunnyvale, CA (US); Pen Chung Li, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/338,914

(22) Filed: Jul. 23, 2014

(65) Prior Publication Data

US 2014/0334473 A1 Nov. 13, 2014

Related U.S. Application Data

(63) Continuation-in-part of application No. 14/249,760, filed on Apr. 10, 2014.
(Continued)

(51) Int. Cl.
*H04B 7/06* (2006.01)
*H04W 28/04* (2009.01)
(Continued)

(52) U.S. Cl.
CPC ......... *H04B 7/0617* (2013.01); *H04B 7/022* (2013.01); *H04B 7/0413* (2013.01);
(Continued)

(58) Field of Classification Search
CPC ..... H04B 7/0617; H04B 7/022; H04B 7/0413
See application file for complete search history.

(56) References Cited

U.S. PATENT DOCUMENTS 6,590,884 B1 7/2003 Panasik
7,599,332 B2 10/2009 Zelst et al.
(Continued)

FOREIGN PATENT DOCUMENTS

WO WO 2009/084904 7/2009
WO WO 2009/152852 12/2009
WO WO-2013/001968 A1 1/2013

OTHER PUBLICATIONS

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
(Continued)

*Primary Examiner* — Brandon M Renner
*Assistant Examiner* — Jay L Vogel

(57) ABSTRACT

In a method for reducing interference in a first wireless communication network and a second wireless communication network, a first access point (AP) device of the first wireless communication network coordinates with a second AP device of the second wireless communication network with respect to utilizing transmit beamforming at the first AP device and transmit beamforming at the second AP device for the purpose of reducing interference in the first wireless communication network and the second wireless communication network. Based on coordinating with the second AP device, the first AP device uses a beamforming matrix to transmit, via a multiple input, multiple output (MIMO) communication channel, to one or more first stations in the first wireless communication network for mitigating inter-
(Continued)

ference between the first wireless communication network and the second wireless communication network.

17 Claims, 9 Drawing Sheets

Related U.S. Application Data

(60) Provisional application No. 61/810,602, filed on Apr. 10, 2013, provisional application No. 61/857,936, filed on Jul. 24, 2013.

(51) Int. Cl.
| | |
|---|---|
| H04B 7/022 | (2017.01) |
| H04B 7/0413 | (2017.01) |
| H04L 25/03 | (2006.01) |
| H04L 25/02 | (2006.01) |
| H04B 7/0456 | (2017.01) |
| H04W 84/12 | (2009.01) |

(52) U.S. Cl.
CPC ......... *H04B 7/0456* (2013.01); *H04B 7/0626* (2013.01); *H04L 25/0204* (2013.01); *H04L 25/03904* (2013.01); *H04L 25/03942* (2013.01); *H04W 28/04* (2013.01); *H04W 84/12* (2013.01)

(56) References Cited

U.S. PATENT DOCUMENTS

| | | | |
|---|---|---|---|
| 7,742,390 B2 | 6/2010 | Mujtaba | |
| 8,270,909 B2 | 9/2012 | Zhang et al. | |
| 8,526,351 B2 | 9/2013 | Fischer et al. | |
| 8,619,907 B2 | 12/2013 | Mujtaba et al. | |
| 2005/0058151 A1 | 3/2005 | Yeh | |
| 2005/0070266 A1* | 3/2005 | Senarath | H04W 16/02 455/422.1 |
| 2006/0067426 A1* | 3/2006 | Maltsev | H04L 27/2602 375/297 |
| 2007/0049218 A1* | 3/2007 | Gorokhov | H04B 7/0417 455/102 |
| 2007/0232235 A1 | 10/2007 | Li et al. | |
| 2008/0240208 A1 | 10/2008 | Lou et al. | |
| 2008/0261658 A1 | 10/2008 | Jin et al. | |
| 2009/0069054 A1* | 3/2009 | Zangi | H04L 5/0023 455/562.1 |
| 2009/0080579 A1* | 3/2009 | Fujii | H04B 7/0634 375/347 |
| 2009/0196163 A1 | 8/2009 | Du | |
| 2010/0091675 A1 | 4/2010 | Sawai | |
| 2010/0103045 A1* | 4/2010 | Liu | H04B 7/0617 342/372 |
| 2010/0272218 A1* | 10/2010 | Yeh | H04B 7/024 375/330 |
| 2010/0279619 A1* | 11/2010 | Yeh | H04B 7/024 455/63.1 |
| 2011/0002219 A1 | 1/2011 | Kim et al. | |
| 2011/0141980 A1* | 6/2011 | Wang | H04W 72/042 370/329 |
| 2011/0223867 A1 | 9/2011 | Chae et al. | |
| 2011/0268217 A1 | 11/2011 | Gormley et al. | |
| 2011/0294514 A1 | 12/2011 | Kulkarni | |
| 2011/0305156 A1* | 12/2011 | Liu | H04L 5/001 370/252 |
| 2012/0026956 A1* | 2/2012 | Benjebbour | H04W 16/12 370/329 |
| 2012/0034874 A1 | 2/2012 | Yiu et al. | |
| 2012/0039196 A1 | 2/2012 | Zhang | |
| 2012/0071116 A1* | 3/2012 | Gong | H04B 7/0408 455/114.2 |
| 2012/0087265 A1* | 4/2012 | Tamaki | H01Q 1/246 370/252 |
| 2012/0149414 A1 | 6/2012 | Krishnaswamy et al. | |
| 2012/0202431 A1* | 8/2012 | Hawryluck | H04B 7/024 455/63.4 |
| 2013/0035128 A1 | 2/2013 | Chan et al. | |
| 2013/0100952 A1* | 4/2013 | Hart | H04L 12/1868 370/390 |
| 2014/0241240 A1 | 8/2014 | Kloper et al. | |
| 2014/0302884 A1* | 10/2014 | Zhao | H04W 52/346 455/522 |
| 2014/0307821 A1 | 10/2014 | Zhang et al. | |

OTHER PUBLICATIONS

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.,* pp. 1-535 Oct. 2009.

IEEE Std 802.11™ 2012 (Revision of IEEE Std 802.11—2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.,* pp. 1-2695 (Mar. 29, 2012).

Catreux, S., et al. "Attainable Throughput of an Interference-Limited Multiple-Input Multiple-Output (MIMO) Cellular System," IEEE Trans. Communications, vol. 49, No. 8, pp. 479-493 (Aug. 2001).

Mujtaba, S.A. "IEEE P802.11—Wireless LANs, TGn Sync Proposal Technical Specification," *The Institute of Electrical and Electronics Engineers, Inc.,* doc.: IEEE 802.11-04/0889r6, pp. 1-131 (May 2005).

Van Nee, et al. "The 802.11n MIMO-OFDM Standard for Wireless LAN and Beyond," Wireless Personal Communications, vol. 37, pp. 445-453 (Jun. 2006).

International Search Report and Written Opinion for corresponding PCT Application No. PCT/US2014/033632, 11 pages (dated Aug. 11, 2014).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.,* pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.,* pp. 1-446 (Jul. 2013).

IEEE Std 802.11h™—2003, "IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe," *The Institute of Electrical and Electronics Engineers, Inc.,* Oct. 14, 2003; 75 pages.

International Search Report and Written Opinion for corresponding PCT Application No. PCT/US2014/047809, 10 pages (dated Oct. 22, 2014).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical

(56) References Cited

OTHER PUBLICATIONS

Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

Ansari et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Chen, "Home Network Basis: Transmission Environments and Wired/Wireless Protocols," *Prentice Hall*, pp. 1-26 (Jul. 2003).

Hiertz et al., "The IEEE 802.11 Universe," *IEEE Communications Magazine*, pp. 62-70, (Jan. 2010).

Love et al., "An Overview of Limited Feedback in Wireless Communication Systems," IEEE J. on Selected Areas in Communications, vo. 26, No. 8, pp. 1341-1365 (Oct. 2008).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Notice of Allowance in U.S. Appl. No. 14/249,760, dated Dec. 3, 2015 (26 pages).

International Preliminary Report on Patentability in International Application No. PCT/US2014/047809, dated Feb. 4, 2016 (8 pages).

International Preliminary Report on Patentability in International Application No. PCT/US2014/033632, dated Oct. 22, 2015 (8 pages).

\* cited by examiner

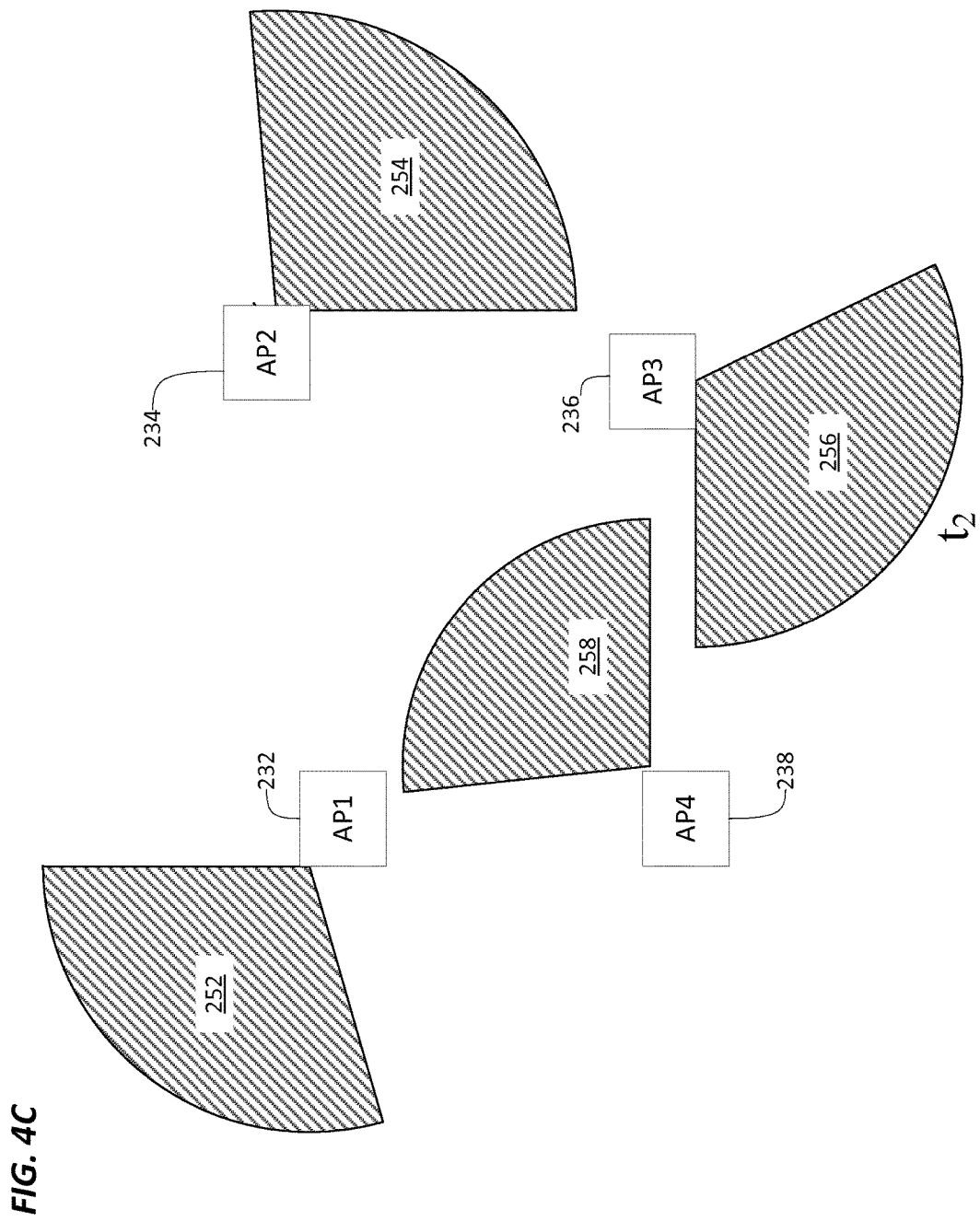

METHOD AND APPARATUS FOR MITIGATING INTERFERENCE IN A WIRELESS NETWORK THROUGH USE OF TRANSMIT BEAMFORMING

CROSS-REFERENCES TO RELATED APPLICATION

The present application is a continuation-in-part of U.S. application Ser. No. 14/249,760, filed on Apr. 10, 2014, entitled "Method and Apparatus for Mitigating Interference in a Wireless Network through Use of Transmit Beamforming," which claims the benefit of U.S. Provisional Patent Application No. 61/810,602, entitled "Interference Mitigation by TxBF," filed on Apr. 10, 2013. Both of the applications referenced above are incorporated herein by reference in their entireties.

Additionally, the present application claims the benefit of U.S. Provisional Patent Application No. 61/857,936, entitled "Interference Mitigation by TxBF," filed on Jul. 24, 2013, which is incorporated herein by reference in its entirety

FIELD OF TECHNOLOGY

The present disclosure relates generally to communication systems and, more particularly, to reducing co-channel interference in wireless local area networks (WLANs).

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method for reducing interference in a first wireless communication network and a second wireless communication network includes coordinating, at a first access point (AP) device of the first wireless communication network, with a second AP device of the second wireless communication network with respect to utilizing transmit beamforming at the first AP device and transmit beamforming at the second AP device for the purpose of reducing interference in the first wireless communication network and the second wireless communication network; and based on coordinating with the second AP device, using a beamforming matrix at the first AP device to transmit, via a multiple input, multiple output (MIMO) communication channel, to one or more first stations in the first wireless communication network for mitigating interference between the first wireless communication network and the second wireless communication network.

In other embodiments, the method includes any suitable combination of one or more of the following features.

The method further includes at least one of: i) determining, at the first AP, the beamforming matrix based on an estimate of the MIMO communication channel, wherein the MIMO communication channel is between the first AP and a particular first station in the first wireless communication network, or ii) receiving, at the first AP, the beamforming matrix, the beamforming matrix having been generated based on the estimate of the MIMO communication channel between the first AP and the particular first station.

The MIMO communication channel is below 6 GHz.

The MIMO communication channel is above 2 GHz.

Coordinating comprises: synchronizing, at the first AP, downlink transmissions of the first AP that utilize transmit beamforming with downlink transmissions of the second AP that utilize transmit beamforming.

Coordinating further comprises: determining a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and selecting, based on the determined performance metric, the particular first station for a scheduled future beamformed transmission from the first AP that overlaps in time with a future beamformed transmission from the second AP to the second station.

The method further includes selecting, at the first AP, the beamforming matrix from a plurality of pre-generated beamforming matrices.

The beamforming matrix is a first beamforming matrix from the plurality of pre-generated beamforming matrices; using the first beamforming matrix comprises using the first beamforming matrix at a first time; and the method further includes: selecting, at the first communication device, a second beamforming matrix from the plurality of pre-generated beamforming matrices, and using the second beamforming matrix at the first communication device at a second time; and coordinating comprises coordinating the first time and the second time with the second AP device for the purpose of reducing interference in the first wireless communication network and the second wireless communication network.

Using the first beamforming matrix at the first time comprises using the first beamforming matrix to transmit a broadcast packet from the first AP device; and using the second beamforming matrix at the second time comprises using the second beamforming matrix to re-transmit the broadcast packet from the first AP device.

In another embodiment, an apparatus corresponding to a first access point (AP) device configured to operate in a first wireless communication network comprises a network interface device including i) a media access control (MAC) processing unit, and ii) a physical layer (PHY) processing unit coupled to the MAC processing unit. The network interface device is configured to coordinate with a second AP device of a second wireless communication network with respect to utilizing transmit beamforming at the first AP device and transmit beamforming at the second AP device for the purpose of reducing interference in the first wireless communication network and the second wireless communication network, and based on coordinating with the second AP device, use a beamforming matrix to transmit, via a multiple input, multiple output (MIMO) communication channel, to one or more first stations in the first wireless communication network for mitigating interference between the first wireless communication network and the second wireless communication network.

In other embodiments, the apparatus includes any suitable combination of one or more of the following features.

The PHY processing unit is configured to at least one of: i) determine the beamforming matrix based on an estimate of the MIMO communication channel, wherein the MIMO communication channel is between the first AP and a particular first station in the first wireless communication network, or ii) receive the beamforming matrix, the beamforming matrix having been generated based on the estimate of the MIMO communication channel between the first AP and the particular first station.

The MIMO communication channel is below 6 GHz.

The MIMO communication channel is above 2 GHz.

The network interface device is further configured to: synchronize downlink transmissions of the first AP that utilize transmit beamforming with downlink transmissions of the second AP that utilize transmit beamforming.

The network interface device is further configured to: determine a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and select, based on the determined performance metric, the particular first station for a scheduled future beamformed transmission from the first AP that overlaps in time with a future beamformed transmission from the second AP to the second station.

The PHY processing device is further configured to select the beamforming matrix from a plurality of pre-generated beamforming matrices.

The beamforming matrix is a first beamforming matrix from the plurality of pre-generated beamforming matrices; the network interface device is configured to: use the first beamforming matrix at a first time, and select a second beamforming matrix from the plurality of pre-generated beamforming matrices, use the second beamforming matrix at a second time, and coordinate the first time and the second time with the second AP device for the purpose of reducing interference in the first wireless communication network and the second wireless communication network.

The network interface device is further configured to: use the first beamforming matrix at the first time comprises to transmit a broadcast packet; and use the second beamforming matrix at the second time to re-transmit the broadcast packet from the first AP device.

In yet another embodiment, a system comprises a first access point (AP) device configured to operate in a first wireless communication network, the first AP device having a first network interface device; and a second AP device configured to operate in a second wireless communication network, the second AP device having a second network interface device. The first network interface device is configured to coordinate with the second AP device with respect to utilizing transmit beamforming at the first AP device and transmit beamforming at the second AP device for the purpose of reducing interference in the first wireless communication network and the second wireless communication network, and based on coordinating with the second AP device, use a first beamforming matrix to transmit, via a first multiple input, multiple output (MIMO) communication channel, to one or more first stations in the first wireless communication network for mitigating interference between the first wireless communication network and the second wireless communication network. The second network interface device is configured to coordinate with the first AP device with respect to utilizing transmit beamforming at the first AP device and transmit beamforming at the second AP device for the purpose of reducing interference in the first wireless communication network and the second wireless communication network, and based on coordinating with the first AP device, use a second beamforming matrix to transmit, via a second MIMO communication channel, to one or more second stations in the second wireless communication network for mitigating interference between the first wireless communication network and the second wireless communication network.

In other embodiments, the system includes any suitable combination of one or more of the following features.

The first network interface device and the second network interface device are further configured to: synchronize downlink transmissions of the first AP that utilize transmit beamforming with downlink transmissions of the second AP that utilize transmit beamforming.

The first network interface device is further configured to select the first beamforming matrix from a plurality of pre-generated beamforming matrices.

The first network interface device is configured to: use the first beamforming matrix at a first time, and select a third beamforming matrix from the plurality of pre-generated beamforming matrices, use the third beamforming matrix at a second time, and coordinate the first time and the second time with the second AP device for the purpose of reducing interference in the first wireless communication network and the second wireless communication network.

The first network interface device is further configured to: determine a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and select, based on the determined performance metric, the particular first station for a scheduled future beamformed transmission from the first AP that overlaps in time with a future beamformed transmission from the second AP to the second station.

BRIEF DESCRIPTION OF THE DRAWINGS

FIG. 4C is a diagram of the plurality of APs of FIG. 4B transmitting the broadcast packets to different sectors at a time $t_2$ to mitigate interference, according to an embodiment.

DETAILED DESCRIPTION

In various embodiments described below, a first communication device (e.g., an access point) in a first wireless network uses a transmit beamforming matrix for the purpose of reducing interference to a second wireless network, the interference to the second wireless network caused by the first communication device transmitting to one or more second communication devices (e.g., clients) in the first wireless network.

Figure 1:
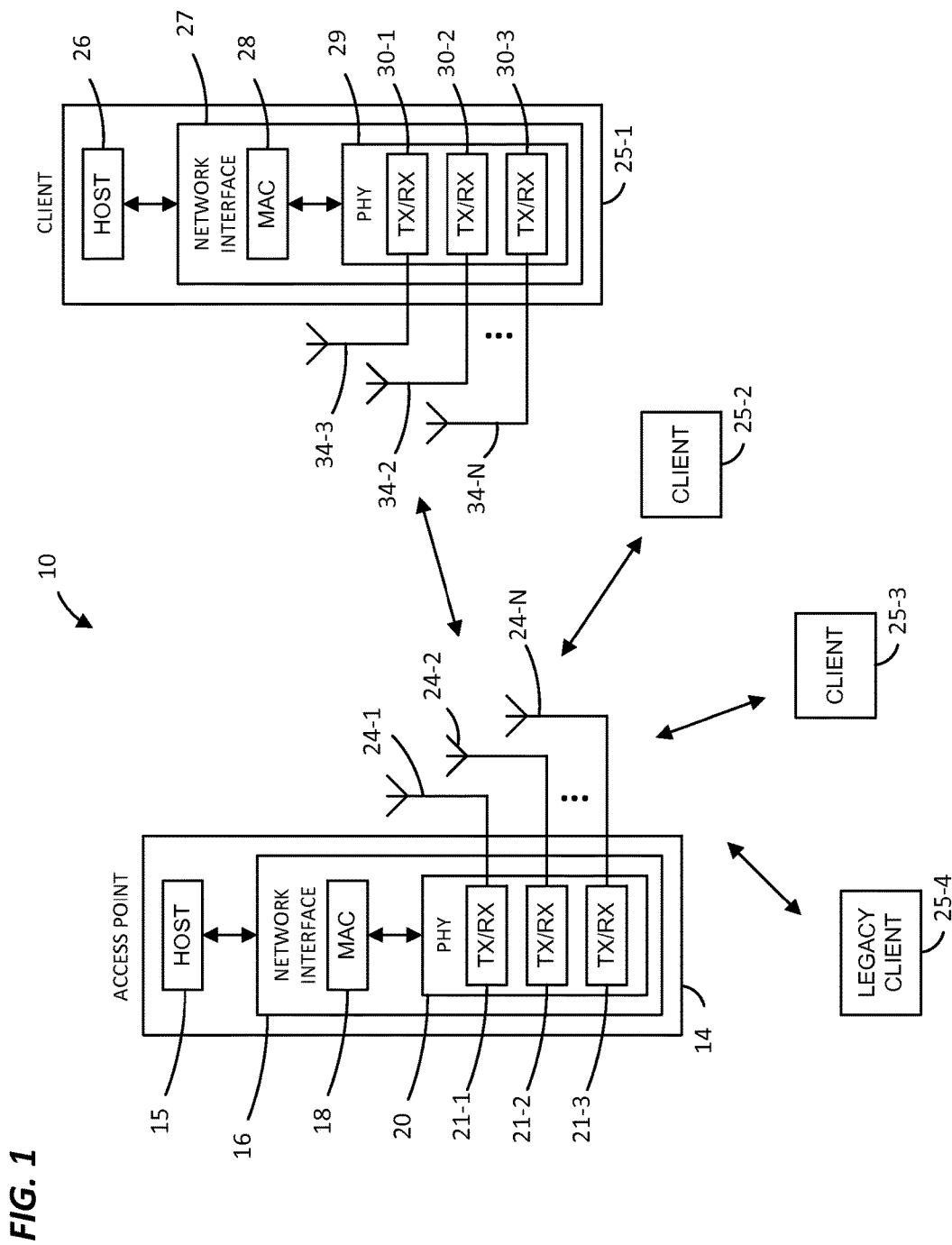
FIG. 1 is a block diagram of an example wireless local area network (WLAN) communication system in which an access point (AP) uses interference mitigation techniques such as described herein, according to an embodiment.

FIG. 1 is a block diagram of an example WLAN 10 in which devices such as an AP 14 and client devices 25 exchange information using OFDM (Orthogonal Frequency-Division Multiplexing) techniques in a multiple input, multiple output (MIMO) mode, according to an embodiment. The AP 14 includes a host processor 15 coupled to a network interface 16. The network interface 16 includes a medium access control (MAC) processing unit 18 and a physical layer processing unit 20. The PHY processing unit 20 includes a plurality of transceivers 21, and the transceivers are coupled to N antennas 24, where N is a suitable positive integer. In FIG. 1, the AP has the same number of transceivers 21 as antennas 24, but in other embodiments, the AP 14 includes different a different number of transceivers 21 than antennas 24 (e.g., there a more antennas than transceivers and antenna switching techniques are utilized). In FIG. 1, three transceivers 21 and three antennas 24 are illustrated, but in other embodiments, the AP 14 includes different suitable numbers of transceivers 21 and antennas 24. (e.g., 1, 2, 4, 5, 6, 8, etc.). In one embodiment, the MAC processing unit 18 and the PHY processing unit 20 are configured to operate according to a communication protocol generally similar to the IEEE 802.11n Standard and/or the IEEE 802.11ac Standard (e.g., a communication protocol that supports beamforming ("a beamforming protocol")), for example.

The network interface device 16 (e.g., the MAC processing unit 18 and/or the PHY processing unit 20) is configured to perform beamforming training procedures with client devices 25, in some embodiments. For example, the network interface device 16 is configured to transmit beamforming training signals to the client device 25 and, in response, receive beamforming feedback from the client device 25, in some embodiments. For example, the beamforming feedback includes a forward channel estimate, and the network interface device 16 (e.g., the PHY processing unit 20) is configured to determine a transmit beamforming matrix based on the forward channel estimate, in an embodiment. As another example, the beamforming feedback includes an indication of the transmit beamforming matrix (e.g., the transmit beamforming matrix, a compressed form of the transmit beamforming matrix, an index to be used for looking up the transmit beamforming matrix in a table, etc.), and the network interface device 16 (e.g., the PHY processing unit 20) is configured to determine the transmit beamforming matrix based on the indication, in an embodiment.

In some embodiments, the network interface device 16 (e.g., the MAC processing unit 18 and/or the PHY processing unit 20) is configured to perform implicit beamforming training procedures with a client device 25 in order to determine a transmit beamforming matrix. For example, in some embodiments, the network interface device 16 (e.g., the PHY processing unit 20) is configured to receiving beamforming training signals from the client device 25 and to determine an estimate of a reverse channel based on the received beamforming training signals. The network interface device 16 (e.g., the PHY processing unit 20) is configured to determine, based on the determined estimate of the reverse channel, a transmit beamforming matrix for use in transmitting to the client device 25.

In some embodiments, the network interface device 16 (e.g., the PHY processing unit 20) includes a memory to store a plurality of pre-generated beamforming matrices. For example, in an embodiment, the plurality of pre-generated beamforming matrices includes respective beamforming matrices corresponding to respective beamforming sectors. In some embodiments, the network interface device 16 (e.g., the PHY processing unit 20) is configured to select a beamforming matrix from the plurality of pre-generated beamforming matrices, and then use the selected beamforming matrix.

A client device 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although the same number of transceivers 30 and antennas 34 are illustrated in FIG. 1, the client device 25-1 includes different numbers of transceivers 30 and antennas 34, in other embodiments. Although three transceivers 30 and three antennas 34 are illustrated in FIG. 1, the client device 25-1 includes different suitable numbers (e.g., 1, 2, 4, 5, etc.) of transceivers 30 and antennas 34 in other embodiments. The transceiver(s) 30 is/are configured to transmit generated data streams via the antenna(s) 34. Similarly, the transceiver(s) 30 is/are configured to receive data streams via the antenna(s) 34.

The network interface device 27 (e.g., the MAC processing unit 28 and/or the PHY processing unit 29) is configured to perform beamforming training procedures with the AP 14, in some embodiments. For example, the network interface device 27 is configured to receive beamforming training signals from the AP 14 and, in response, generate beamforming feedback and transmit the beamforming feedback to the AP 14, in some embodiments. For example, the network interface device 27 (e.g., the PHY processing unit 29) is configured to determine forward channel estimate based on the received training signals, in an embodiment. The network interface device 27 (e.g., the PHY processing unit 29) is configured to transmit an indication of the forward channel estimate (e.g., the forward channel estimate or a compressed form of the forward channel estimate) to the AP 14, in an embodiment.

In some embodiments, the network interface device 27 (e.g., the PHY processing unit 29) is configured to determine, based on the forward channel estimate, a transmit beamforming matrix to be used by the AP 14. The network interface device 27 (e.g., the PHY processing unit 29) is configured to transmit beamforming feedback to the AP 14 that includes an indication of the determined transmit beamforming matrix (e.g., the transmit beamforming matrix, a compressed form of the transmit beamforming matrix, an index to be used for looking up the transmit beamforming matrix in a table, etc.), in an embodiment.

In some embodiments, the network interface device 27 (e.g., the PHY processing unit 29) is configured to transmit to the AP 14 beamforming training signals as part of an implicit beamforming training procedure.

In an embodiment, one or both of the client devices 25-2 and 25-3 have a structure the same as or similar to the client device 25-1. In these embodiments, the client devices 25 structured like the client device 25-1 have the same or a different number of transceivers and antennas. For example, the client device 25-2 has only two transceivers and two antennas, according to an embodiment.

In an embodiment, the PHY processing unit 20 and the PHY processing unit 29 are configured to utilize interference mitigation techniques in conjunction with utilizing MIMO communication channels below 6 GHz. In an embodiment, the PHY processing unit 20 and the PHY processing unit 29 are configured to utilize interference mitigation techniques in conjunction with utilizing MIMO communication channels between 2 GHz and 6 GHz.

Figure 2:
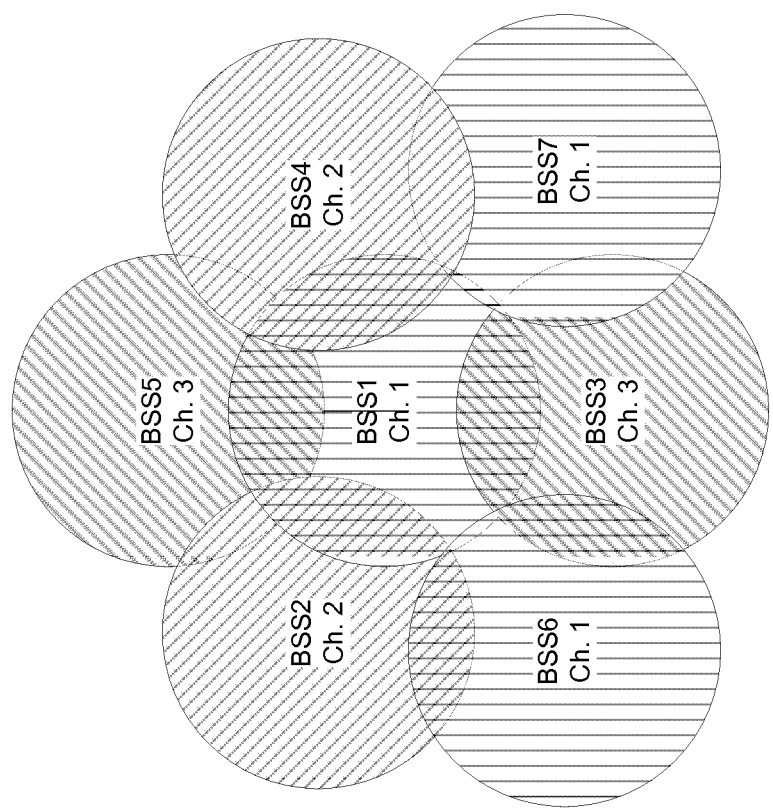
FIG. 2 is a diagram illustrating an example of a plurality of WLAN APs that are densely deployed.

FIG. 2 is a diagram illustrating an example of a plurality of WLAN APs that are densely deployed. Each AP coordinates a respective basic service set (BSS). Because the dense deployment, the each BSS overlaps with one or more other BSSs (i.e., overlapping BSSs (OBSSs)). With OBSSs, co-channel interference (CCI), may reduce performance, sometimes significantly. For instance, in the 2.4 GHz band there are only three 20 MHz channels, so the ability to avoid interference by using different channels is limited, and CCI and/or OBSS can be a major issue.

When an OBSS collision happens (e.g., a packet transmitted from a member of a first BSS is received by a member of a second BSS), two categories of impact, corresponding to unicast packets and broadcast packets, are generally expected.

With a collision involving a unicast packet (e.g., a unicast packet transmitted from a member of a first BSS is received by a member of a second BSS), receipt of the unicast packet may trigger a clear channel assessment (CCA) process, and may initiate a PHY processing device of the receiver to start PHY decoding of the unicast packet. Eventually, a MAC processing device of the receiver will determine that a MAC address in the unicast packet does not match an address of the receiver and further processing of the packet will end. The CCA process, however, will determine that the channel is busy until the end of the unicast packet and thus transmission by the device that receives the unicast packet at least until the end of the unicast packet will be blocked.

With a collision involving a broadcast packet (e.g., a broadcast packet such as a management frame, a control frame, etc., transmitted from a member of a first BSS is received by a member of a second BSS), receipt of the broadcast packet may trigger CCA, PHY processing, and MAC processing such as discussed above. Moreover, the MAC processing may continue processing a management frame until the end of the packet. Such MAC processing may result in the setting of a network allocation vector (NAV), which may correspond to a duration longer than the duration of the broadcast packet. Thus, transmission by the device that receives the broadcast packet may be blocked for an even longer duration than with the unicast packet scenario.

In WLANs configured according to any of the IEEE 802.11a/g/n/ac or the IEEE 802.11 high efficiency WLAN (HEW) standard (now under development), there are two broad categories of transmission types: i) contention-based transmissions in which devices compete for the media on per-packet basis, and ii) transmit opportunity (TxOP) protected transmissions (time sharing) in which devices compete for the media by reserving a service period (e.g., a TxOP period) using request to send (RTS) and clear to send (CTS) exchange or CTS-to-self frames. WLAN systems configured according to any of the IEEE 802.11a/g/n/ac/ HEW standards are sometimes referred to herein as "WiFi systems". In contention-based transmissions, CCI/OBSS will cause a higher chance for collisions when a so-called "hidden node" scenario occurs (i.e., a hidden node scenario occurs when an AP can hear two STAs, but the STAs cannot hear each other). With TxOP protected transmissions, CCI/ OBSS will result in shorter TxOP periods because more devices in a given vicinity are trying to reserve a TxOP period. For example, an AP or STAs of a first BSS that overlaps with a second BSS may overhear RTS/CTS exchanges of the second BSS.

In an ideal situation in which all RTS/CTS exchanges and CTS-to-self transmissions can be heard by all devices in OBSSs, no collisions ought to happen. In this case, the sum throughput can be estimated as an average of single-link throughput, which is not catastrophic. In reality, however, different APs are not coordinated, and perfect time sharing is almost not possible. Collisions among OBSS will happen and significantly affect sum throughput, and for some users the effects of such collisions may be catastrophic (e.g., near zero throughput). For example, in some scenarios, RTS/ CTS/CTS-to-self frames themselves could be under collision and/or not decodable by hidden nodes, and thus some device may not be able to obtain a TxOP period.

As discussed in more detail below, WLAN transmit beamforming (TxBF) technology is utilized to mitigate negative effects of CCI/OBSS. For example, TxBF increases SNR at intended devices within a BSS and, at least in some scenarios, decreases SNR at unintended devices in a neighboring BSS. In some embodiments, TxBF exploits spatial diversity gain. Such use of TxBF will outperform open loop (unsteered) MIMO transmission, at least in some embodiments, especially when the number of transmit antennas ($N_{Tx}$) exceeds the number of spatial streams (Nss). In some embodiments in which MIMO-OFDM is utilized, TxBF strategies are for each (group of adjacent) subcarrier(s). TxBF techniques described herein are accomplished solely using digital signal processing techniques, and do not utilize directional antennas.

Figure 3A:
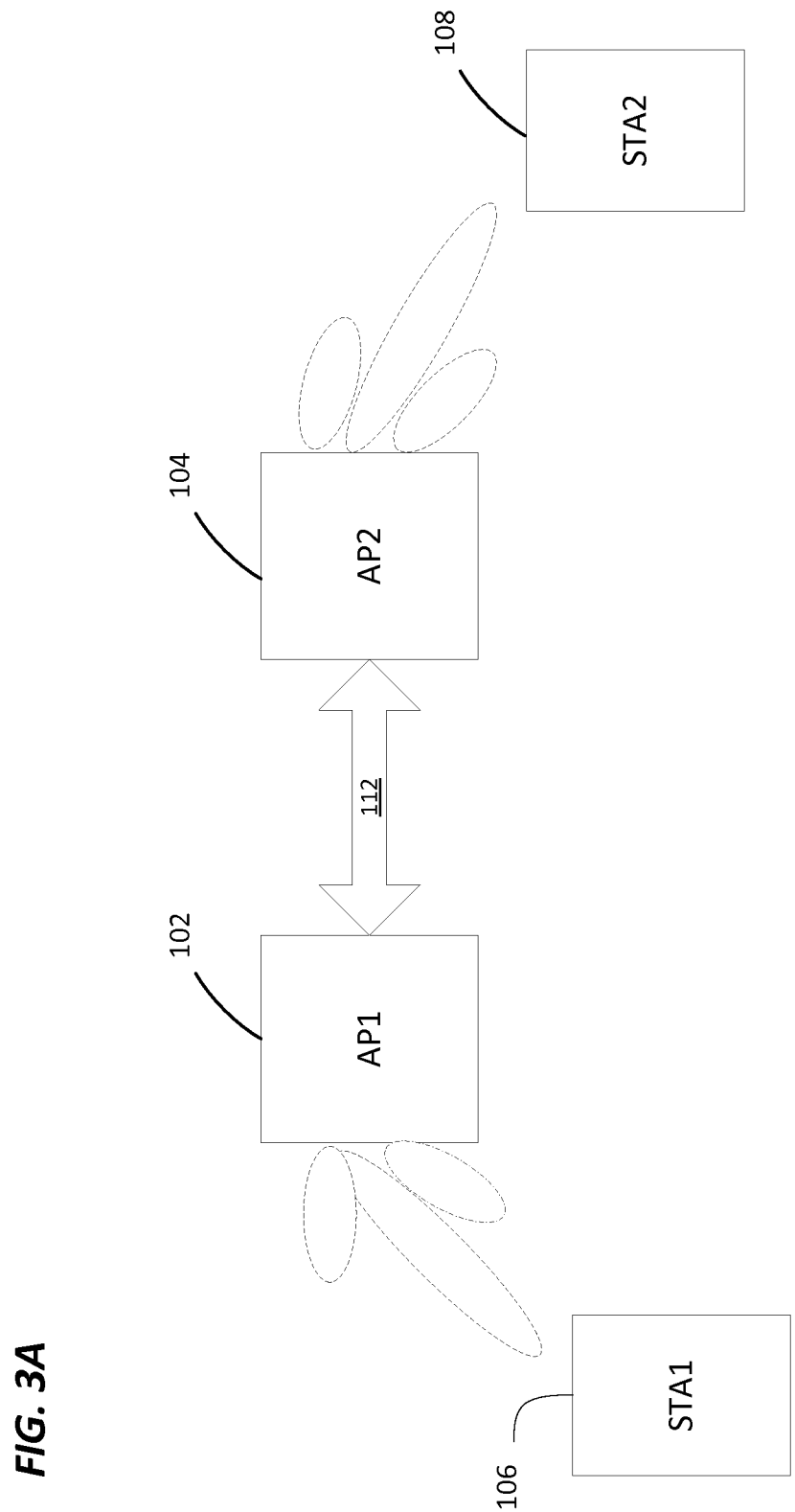
FIG. 3A is a block diagram of an example communication system in which a plurality of APs have overlapping service areas and use beamforming to mitigate interference, according to an embodiment.

FIG. 3A is a block diagram of an environment in which multiple APs are operating, each AP corresponding to a different WLAN, according to an embodiment. In the example of FIG. 3A, two APs 102, 104 have overlapping respective service areas. In an embodiment, AP1 102 has a structure the same or similar to the AP 14 (FIG. 1), and AP2 104 has a structure the same or similar to the AP 14 (FIG. 1).

To reduce interference with the second wireless network associated with AP2 104, AP1 102 performs beamforming, using a beamforming matrix, when transmitting data streams to a client device 106 in the first wireless network. The beamforming matrix may be determined based on measuring the channel between AP1 102 and the client device 106.

With reference to FIGS. 1 and 3A, the PHY processing unit 29 of the client device 106 performs channel measurements, based on training signals received from the AP 14, to generate a channel estimate represented by a matrix H. The channel matrix H is generally is of dimension $N_R \times N_{TX}$, where $N_{TX}$ is the number of transmit antennae at AP1 102 and $N_R$ is the number of receive antennae at the client device

106. The channel estimate H is an estimate of a forward channel from the AP1 102 to the client 106.

In an embodiment, the client device 106 then transmits the channel estimate (e.g., the matrix H or a compressed form of H) to the PHY processing unit 20 of AP1 102, and as a result AP1 102 generates a beamforming matrix Q based on the channel estimate. The beamforming matrix Q is generally of dimension $N_{TX} \times N_{SS}$, where $N_{TX}$ is the number of transmit antennae at AP1 102 and $N_{SS}$ is the number of spatial streams that AP1 102 uses for transmission to the client device 106. Alternatively, the client device 106 may generate a beamforming matrix based on the channel estimate and transmit an indication of the beamforming matrix Q (e.g., the matrix Q, a compressed form of Q, an index to permit looking up Q in a table, etc.) to AP1 102.

In other embodiments and/or scenarios, knowledge of the forward channel is determined by AP1 102 using knowledge of a reverse channel from the client device 106 to the AP1 102. Obtaining knowledge of the reverse channel includes the AP1 102 receiving known training signals from the client device 106. The AP1 102 then generates a measurement or estimate of the reverse channel based on the received training signals. The AP1 102 then utilizes the reverse channel estimate to determine an estimate of the forward channel using a suitable technique. The AP1 102 next generates the transmit beamforming matrix using the forward channel estimate as described above. In some embodiments, the transmit beamforming matrix may be generated from the estimate of the reverse channel without first using the estimate of the reverse channel to calculate an estimate of the forward channel.

In other embodiments, the beamforming matrix Q is not generated based on a measurement of the channel, but is instead a pre-generated beamforming matrix stored in a memory. As discussed above, a plurality of pre-generated matrices may be stored in the memory, and the AP1 102 may select the beamforming matrix Q from the plurality of pre-generated matrices.

In any event, once the beamforming matrix Q is generated or selected, AP1 102 transmits data to the client device 106 utilizing the beamforming matrix Q for the purpose of reducing interference caused by AP1 102 transmitting the data to the client device 106, in an embodiment. In some scenarios, the AP1 102 using the beamforming matrix Q results in reducing interference, by the AP1 102, to communications in the second wireless network, e.g., communications between the AP2 104 and the client device 108.

In an embodiment, AP2 104 also similarly uses a beamforming matrix determined based on a channel estimate of a communication channel between AP2 104 and client device 108, or uses a selected, pre-generated beamforming matrix, for the purpose of reducing interference caused by AP2 104 transmitting the data to the client device 108, in an embodiment. In some scenarios, the AP2 104 similarly using a beamforming matrix Q results in reducing interference, by the AP2 104, to communications in the first wireless network, e.g., communications between the AP1 102 and the client device 106.

According to an embodiment in which orthogonal frequency division multiplexing (OFDM) is utilized, N channel estimate matrices are generated for the multiple OFDM tones utilized for transmission, and N (or some suitable number less than N) TxBF matrices are generated using the N (or a suitable number less than N) channel estimate matrices. In some embodiments and/or scenarios, N does not correspond to the total number of OFDM tones, but corresponds to a subset of the total number of OFDM tones. For example, in some embodiments, respective TxBF matrices are generated for different adjacent groups of OFDM tones (e.g., a respective TxBF matrix for a respective group of adjacent OFDM tones).

In some embodiments, such TxBF increases the robustness against CCI. For instance, the CCI is not white (e.g., like an intended signal, CCI travels through wireless channels), and hence the CCI fluctuates significantly across different tones. Some tones could have a very low SINR. In some embodiments, a WLAN utilizes bit interleaved coded modulation OFDM (BICM-OFDM) where performance is mainly determined by a few weakest tones (e.g., tones with the worst SINR). Therefore, a few tones with bad SINR may significantly drag down overall throughput, at least in some embodiments. As a result, an X decibel (dB) reduction in time domain SINR may cause a transmit power vs. decibel-miniWatt (TP-vs-dBm) performance drop for much more than X dB. In some embodiments, TxBF leverages array gain plus diversity gain, so TxBF increases the intended signal strength at each tone. In particular, TxBF may "save" the few bad tones (e.g., OFDM tones with poor SINR) and provide good performance even under strong CCI.

Compared with prior art non-beamforming (omni) systems, more energy is "focused" to the "direction" of the intended client on average, and thus the energy leakage to other unintended devices may also be reduced on average, at least in some embodiments. The degree of reduction of energy leakage to other unintended devices may depend on geometrical locations of various devices in the OBSS. For example, if an unintended device is in the same general direction as an intended device, TxBF to the intended device typically will not reduce energy leakage to the unintended device.

When each of all (or most) adjacent APs utilize TxBF to their own sets clients, the overall SINR at each client and each AP in the whole area can be greatly improved, and thus overall network throughput may also be greatly improved.

TxBF improves per-client throughput, hence reducing the airtime for fixed quantity of data for each client. The reduced airtime requirements also reduce CCI. For example, a typical usage case in a public WiFi hotspot is Internet browsing, texting, etc.—with fixed data amount (e.g. load a webpage, transmit a text message, etc.). Airtime for the fixed-amount service data is reduced proportionally to throughput increase brought by TxBF. Shorter airtime further reduces the chance of OBSS collisions (interference) to adjacent BSSs, and it also reduces required TxOP durations.

When CCI/OBSS happens in a perfect time sharing scenario (which is an unrealistic assumption), the throughput gain from TxBF should be just the averaged TxBF gain in link level (e.g., typically 6-12 dB for a system with 4 transmit antennas at the beamformer (e.g., the access point) and one receive antenna at the beamformee (e.g., the client), depending on channel conditions). On the other hand, for realistic collision scenarios, TxBF could lead to much larger percentage gains in throughput, especially for clients with catastrophic impacts from OBSS collisions that would occur without TxBF.

With systems configured according to the 802.11ac standard or the 802.11 HEW standard, because an AP could transmit in channels that occupy 80 MHz or even 160 MHz, OBSS on secondary channels will likely happen more frequently, and thus more collisions will happen. Accordingly, in systems configured according to the 802.11 ac standard or the 802.11 HEW standard, TxBF will likely be even more helpful, at least in some embodiments.

In some embodiments, AP1 102 and AP2 104 are communicatively coupled via a communication link 112 separate from the first wireless network and the second wireless network. In some embodiments, AP1 102 and AP2 104 coordinate transmit beamforming for the purpose of mitigating interference to the second wireless network caused by AP1 102 transmitting in the first wireless network, and/or interference to the first wireless network caused by AP2 104 transmitting in the second wireless network.

In some embodiments, an AP, such as AP1 102 and/or AP2 104, does not need to recognize that other APs are within an overlapping service area before performing beamforming. Instead, in an embodiment, beamforming is performed regardless to reduce the likelihood of interference with any APs that may transmit signals in an overlapping service area.

In other embodiments, AP1 102 communicates with AP2 104 to determine whether interference mitigation techniques, such as described herein, should be utilized. In an embodiment, AP1 102 and AP2 104 perform transmit beamforming when transmitting to intended client devices so that both AP1 102 and AP2 104 reduce interference with the other wireless network.

Further, according to one embodiment, AP1 102 selects a transmit opportunity period for transmitting first data to one or more intended client devices 106. AP1 102 communicates the transmit opportunity period to AP2 104 so that AP2 104 transmits second data to its intended client devices 108 during a time period that coincides with the transmit opportunity period communicated by AP1 102. For example, AP1 102 may designate times $t_1$, $t_4$, $t_7$, $t_{10}$, etc., as transmit opportunity periods, and AP2 104 also transmits to client devices 108 at times $t_1$, $t_4$, $t_7$, $t_{10}$, etc. In an embodiment, AP1 102 and AP2 104 also coordinate uplink time slots (e.g., uplink time slots are scheduled to occur alternatively between the first wireless network and the second wireless network) so that AP1 102 and AP2 104 receive signals from their respective intended client devices at different times to avoid collisions. For example, AP1 102 and AP2 104 may agree that times $t_2$, $t_5$, $t_8$, etc., are designated as uplink time slots for AP1 102 to receive signals from client devices 106, and that e times $t_3$, $t_6$, $t_9$, etc., are designated as uplink time slots for AP2 104 to receive signals from client devices 108. In some embodiments, during designated uplink time slots for AP2 104, AP1 102 may go to sleep (e.g., enter a power save mode) to conserve power.

Figure 3B:
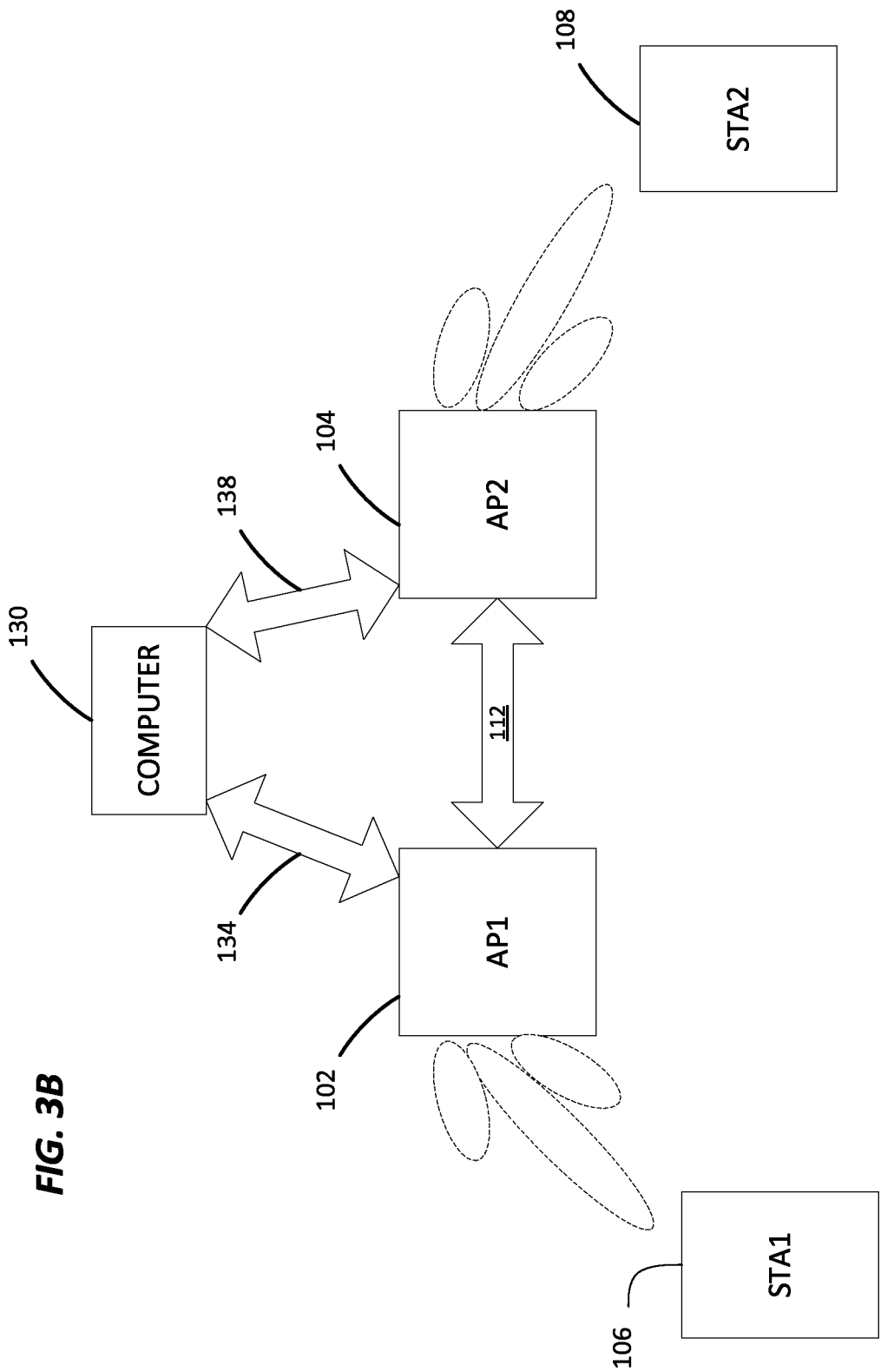
FIG. 3B is a block diagram of another example communication system in which a host coordinates a plurality of APs to mitigate interference, according to an embodiment.

In another embodiment, a computer (e.g., a communication device) separate from AP1 102 and AP2 104 coordinates transmit beamforming for the purpose of mitigating interference to the second wireless network caused by AP1 102 transmitting in the first wireless network, and/or interference to the first wireless network caused by AP2 104 transmitting in the second wireless network. Turning now to FIG. 3B, in an embodiment, a computer 130 is communicatively coupled to AP1 102 via a communication link 134 separate from the first wireless network and the second wireless network. Additionally, the host computer 130 is communicatively coupled to AP2 104 via a communication link 138 separate from the first wireless network and the second wireless network. The computer 130 coordinates transmit beamforming for the purpose of mitigating interference to the second wireless network caused by AP1 102 transmitting in the first wireless network, and/or interference to the first wireless network caused by AP2 104 transmitting in the second wireless network.

While two APs 102 and 104 and one client device corresponding to each AP are illustrated in FIGS. 3A and 3B, other embodiments may include different suitable numbers (e.g., 3, 4, 5, 6, etc.) of APs and different suitable numbers (e.g., 2, 3, 4, 5, 6, etc.) of client devices corresponding to each AP. In these embodiments, one or several APs may participate in coordinating beamforming for the plurality of APs.

Additionally, while one computer 130 (e.g., a communication device) is illustrated in FIG. 3B, any suitable number of computer may be used to coordinate beamforming for multiple APs.

In some embodiments, interference mitigation techniques such as described above are utilized in conjunction with an AP transmitting unicast and/or multicast packets, and single-user and/or multi-user transmissions.

Figure 4A:
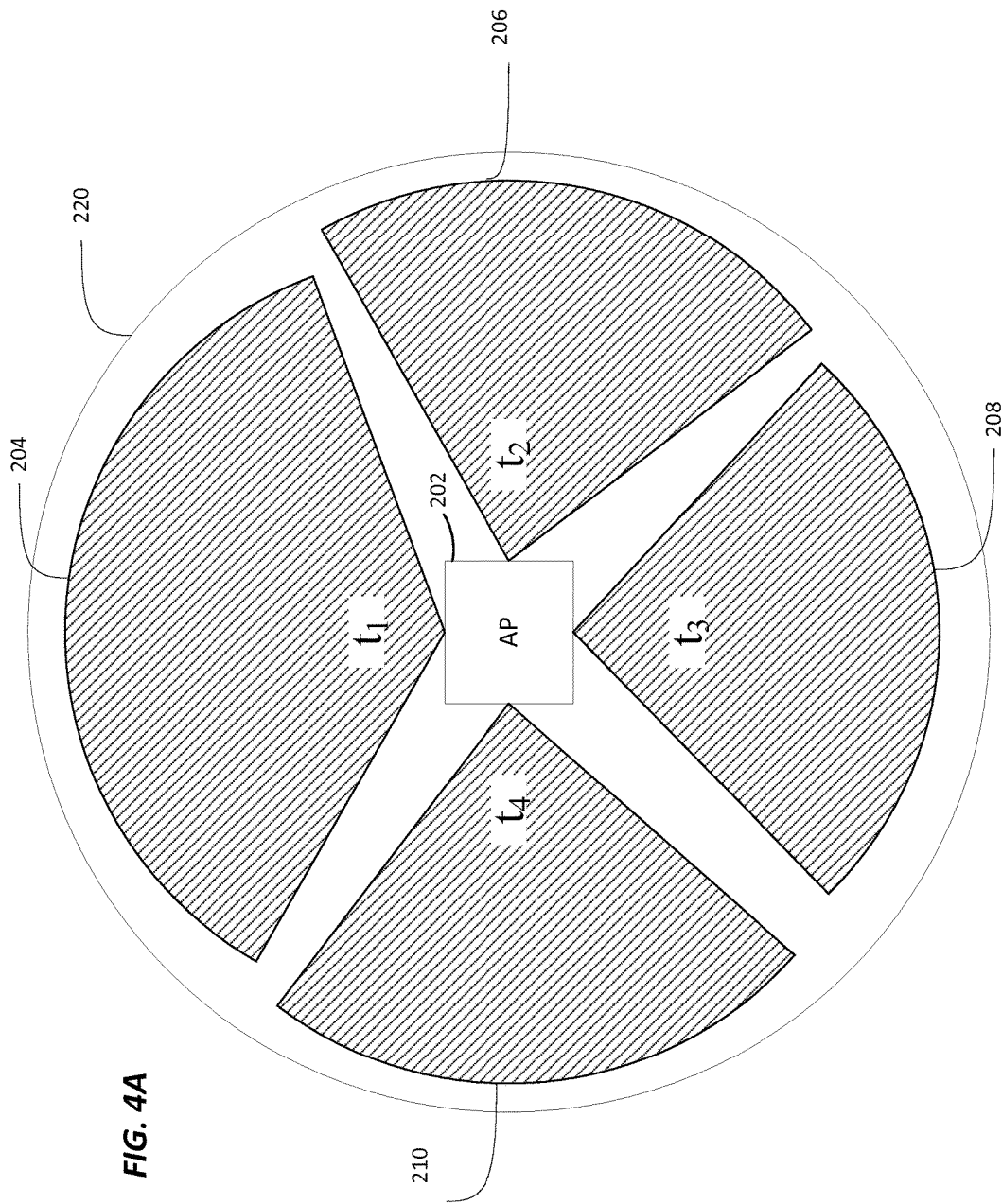
FIG. 4A is a diagram of a service area of an example AP in which the AP transmits in sectors using beamforming matrices, according to an embodiment.

FIG. 4A is a diagram of an example AP 202 according to an embodiment. AP 202, which has a structure the same or similar to the AP 14 of FIG. 1, is configured to use pre-generated beamforming matrices to transmit to different sectors within a service area 220. In particular, AP 202 is configured to use a respective pre-generated beamforming matrix to transmit to one of sectors 204, 206, 208, and 210 that generally cover the service area 220. For example, in one embodiment, AP 202 retrieves a first beamforming matrix when AP 202 is to transmit to sector 204, and then utilizes the first beamforming matrix to transmit to sector 204; AP 202 retrieves a second beamforming matrix when AP 202 is to transmit to sector 206, and then utilizes the second beamforming matrix to transmit to sector 206; AP 202 retrieves a third beamforming matrix when AP 202 is to transmit to sector 208, and then utilizes the third beamforming matrix to transmit to sector 208; and AP 202 retrieves a fourth beamforming matrix when AP 202 is to transmit to sector 210, and then utilizes the fourth beamforming matrix to transmit to sector 210. In some embodiments, the pre-loaded beamforming matrix is calibrated by measuring the channel quality at two receivers (receiver 1 and receiver 2, not shown) in different sectors. For example, receiver 1 is placed in sector 204 at a desired direction and range from the AP 202, while receiver 2 is placed in sector 206 at an undesired direction. The AP 202 then transmits training signals using the first beamforming matrix designed to direct the training signals to sector 204. Both receiver 1 and receiver 2 measure the signal quality of the received signals, by for example measuring corresponding received signal strength indicators (RSSIs). The first beamforming matrix is then adjusted until the RSSI is maximized at sector 204 and minimized at sector 206, in an embodiment. For example, the first beamforming matrix may be adjusted until the RSSI exceeds a first predetermined threshold in the desired direction and the RSSI drops below a second predetermined threshold in the undesired direction. The adjusted beamforming matrix is then stored for future use when transmitting to sector 204 is desired. Beamforming matrices corresponding to the other sectors may be similarly adjusted, in an embodiment.

In an embodiment, the AP 202 transmits broadcast packets to one sector of service area 220 at a time, transmitting the broadcast packets to the whole service area after several time intervals. For example, the AP 202 selects a transmit opportunity period, $t_1$, to transmit broadcast packets to sector 204. At time $t_1$, the AP 202 utilizes the first beamforming matrix to transmit the broadcast packet to sector 204. Moreover, the AP 202 selects a different transmit opportunity period, $t_2$, to transmit the broadcast packet to sector 206. At time $t_2$, the AP 202 utilizes the second beamforming matrix to transmit the broadcast packet to sector 206. The AP 202 may then continue to transmit the broadcast packet in this manner until the broadcast packet has been transmitted to the whole service area. While four sectors are illustrated in FIG. 4A, and thus it would take four time intervals to transmit data streams to the whole service area 220, a service area may be divided into any suitable number (e.g., two, three, five, six, etc.) of sectors. Therefore, it may take any suitable number of time intervals (e.g., two, three, five, six, etc.) for the AP 202 to transmit data streams to the entire service area 220, one sector at a time.

Figure 4B:
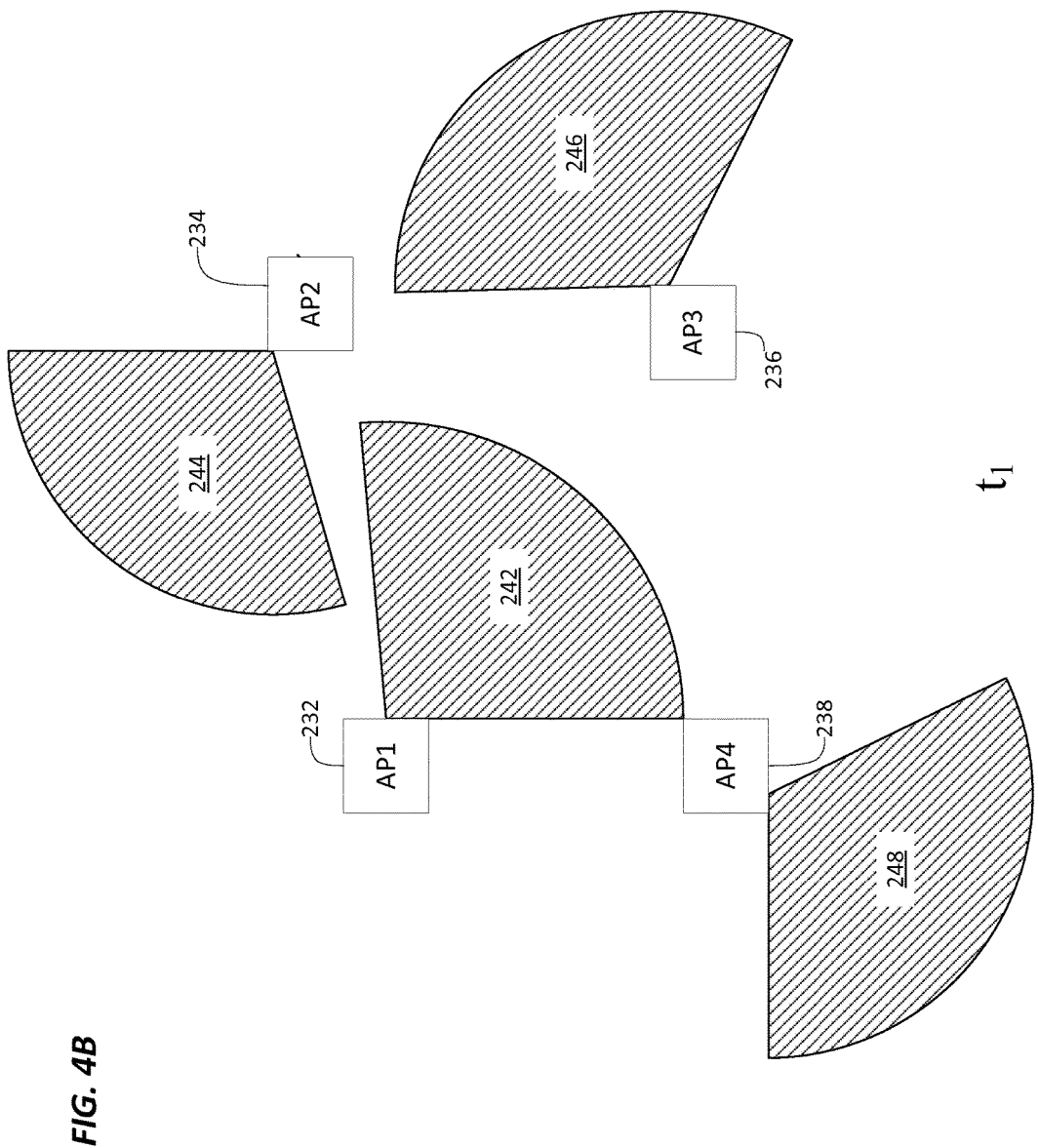
FIG. 4B is a diagram of a plurality of example APs transmitting broadcast packets to different sectors at a time $t_1$ to mitigate interference, according to an embodiment.

Additionally, multiple APs which are broadcasting packets may coordinate with one other (and/or via a computer similar to the system of FIG. 3B) so that the APs broadcasts packets to non-overlapping sectors (or sectors with minimal or reduced overlap. For example, FIG. 4B is a diagram of an example system comprising four APs, AP1 232, AP2 234, AP3 236 and AP4 238 260. The four APs coordinate with one another other (and/or via a computer similar to the system of FIG. 3B) to determine when to broadcast in which sectors to minimize interference caused by the broadcasts, in an embodiment.

For example, AP1 232 broadcasts in a sector 242 during a time period $t_1$; AP2 234 broadcasts in a sector 244 during the time period $t_1$; AP3 236 broadcasts in a sector 246 during the time period $t_1$; and AP4 238 broadcasts in a sector 248 during the time period $t_1$.

On the other hand, FIG. 4C is a diagram of the example system of FIG. 4B during a time period $t_2$. AP1 232 broadcasts in a sector 252 during the time period $t_2$; AP2 234 broadcasts in a sector 254 during the time period $t_2$; AP3 236 broadcasts in a sector 256 during the time period $t_2$; and AP4 238 broadcasts in a sector 258 during the time period $t_2$.

In an embodiment, the time period $t_1$ and the time period $t_2$ may correspond to different transmit opportunity (TXOP) periods.

In some embodiments, multiple APs may coordinate with one other (and/or via a computer similar to the system of FIG. 3B) so that the APs schedule respective downlink TXOPs to correspond to a same time period and to use beamforming techniques, such as described above, during the TXOPs. Similarly, in some embodiments, multiple APs may coordinate with one other (and/or via a computer similar to the system of FIG. 3B) to schedule respective uplink time slots so that transmissions of respective clients in respective wireless networks have no or reduced collisions. In some of such embodiments, when there are no scheduled uplink transmissions to a particular AP during an uplink time slot, the particular AP optionally may go into a low power mode (e.g., a sleep mode) during the uplink time slot.

In some embodiments, two or more APs may coordinate by at least applying probing and/or training during a TxOP period in which both APs transmit respective beamformed packets to respective ones of their clients simultaneously. In an embodiment, the APs analyze performance metrics regarding the reception of the beamformed packets. For example, in various embodiments, the APs analyze one of or any suitable combination of two or more of: i) SINR measurements corresponding to the beamformed packets, ii) individual throughput measurements corresponding to the beamformed packets, iii) a sum of throughput measurements corresponding to the beamformed packets, etc. Analyzing a performance metric includes, in some embodiments, comparing the performance metric (e.g., an SINR measurement, an individual throughput measurement, a sum throughput measurement, etc.) to a suitable threshold to determine if the performance metric meets the threshold (e.g., is greater than, is greater than or equal to, etc.). For example, in an embodiment, if one or more performance metrics meet one or more respective suitable thresholds, performance is determined, by the APs, to be acceptable. As another example, in an embodiment, if at least a minimum number of performance metrics meet respective suitable thresholds, performance is determined, by the APs, to be acceptable.

If it is determined that performance is acceptable, then the APs intentionally schedule respective TxOPs to the respective clients, so that respective transmissions during the respective TxOPs occur at the same time (e.g., overlap in time), but TxBF may acceptably mitigate any resulting interference. If it is determined that performance is not acceptable, then the APs may apply probing and/or training, as discussed above, with different sets their clients. The process may be repeated to find multiple sets of clients to which the multiple APs can transmit simultaneously using TxBF, where TxBF may acceptably mitigate any resulting interference.

In other embodiments, coordination techniques similar to those described above are utilized without training/probing. Rather, for example, a first AP tries transmitting a beamformed packet to a selected client of the first AP (e.g., selected randomly or using another suitable selection technique) using TxBF during a first TxOP known to correspond in time with a second TxOP of a second AP and also known likely result in collisions with transmissions by the second AP to a second client of the second AP. Similar to techniques discussed above, the first AP analyzes performance metrics regarding the reception of the beamformed packet. If it is determined that performance is acceptable, then the first AP and the second AP intentionally schedule respective TxOPs to the first client and the second client, so that respective transmissions during the respective TxOPs occur at the same time (e.g., overlap in time), but TxBF may acceptably mitigate any resulting interference. If it is determined that performance is not acceptable, then the first AP may analyze the reception of a beamformed packet to another selected client of the first AP transmitted during a third TxOP known to correspond in time with a fourth TxOP of the second AP and also known likely result in collisions with transmissions by the second AP to the second client of the second AP. The process may be repeated to find multiple sets of clients to which the multiple APs can transmit simultaneously using TxBF, where TxBF may acceptably mitigate any resulting interference.

In some embodiments, each AP 232, 234, 236, 238 may use TxBF to transmit broadcast packets (e.g., management frames, control frames, etc.) to a single sector, and the APs 232, 234, 236, 238 coordinate (e.g., according to the geometry of the locations of the APs 232, 234, 236, 238) to cover the whole service area with minimum CCI. On the other hand, in some embodiments, each AP 232, 234, 236, 238 may use TxBF to transmit broadcast packets (e.g., management frames, control frames, etc.) to a single sector at any given time, but re-transmit the broadcast packets to other sectors at other times. The APs 232, 234, 236, 238 coordinate to avoid two or more APs transmitting overlapping broadcast signals at a given time.

In some embodiments, each AP 232, 234, 236, 238 may use TxBF to transmit a respective unicast packet to a single respective sector, and the APs 232, 234, 236, 238 coordinate (e.g., according to the geometry of the locations of the APs 232, 234, 236, 238) so that no two APs transmit overlapping signals at a given time. Similarly, in some embodiments, each AP 232, 234, 236, 238 may use TxBF to transmit one or more unicast packets to a single sector at any given time, but transmit other unicast packets to other sectors at other times. The APs 232, 234, 236, 238 coordinate to avoid two or more APs transmitting overlapping signals at a given time.

In various embodiments, techniques described above can be combined in any suitable combination. As an illustrative example, in an embodiment, a network interface of an AP may be configured to utilize the beamforming techniques described above with respect to FIG. 3A and/or FIG. 3B, for example, when transmitting unicast packets (and/or multicast packets, (and/or single user transmissions and/or multi-user transmissions), and use beamforming techniques described above with respect to FIG. 4A and/or FIGS. 4B and/or FIG. 4C, for example, when transmitting broadcast packets.

Figure 5:
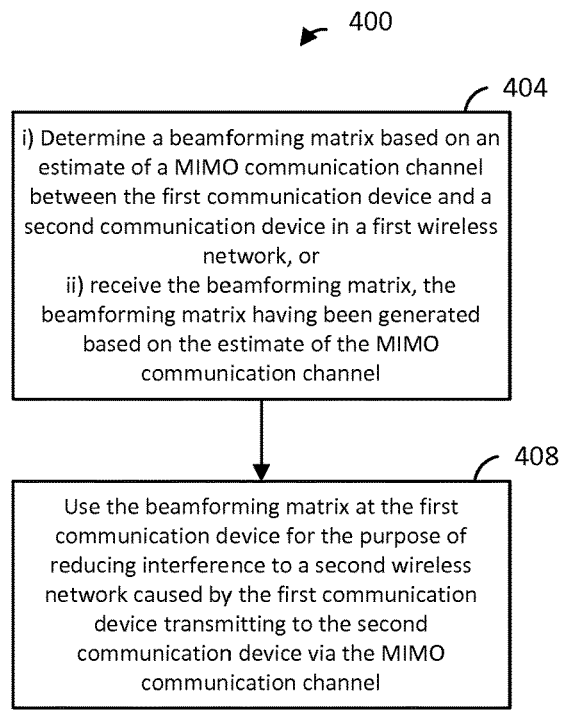
FIG. 5 is a flow diagram of an example method for reducing interference with other wireless network devices, according to an embodiment.

FIG. 5 is a flow diagram of an example method 400 for reducing interference in wireless communications. The method 400 is implemented at a first communication device that belongs to a first wireless network (e.g., a WLAN or another suitable wireless network). The method 400 is implemented by the network interface 16 of access point 14, in an embodiment, and the method 400 is discussed with reference to FIG. 1 for illustrative purposes. In other embodiments, the method 400 is implemented by another suitable communication device, e.g. by a suitable network interface device of the communication device.

At block 404, the first communication device determines a beamforming matrix based on an estimate of a MIMO communication channel between the first communication device and a second communication device in the first wireless network, in an embodiment.

Alternatively at block 404, in another embodiment, the first communication device receives the beamforming matrix, the beamforming matrix having been generated based on the estimate of the MIMO communication channel. For example, as discussed above, the second communication device may generate a beamforming matrix for use by the first communication device, and then the second communication device may transmit the beamforming matrix to the first communication device.

In an embodiment, the PHY processing unit 20 is configured to implement block 404.

At block 408, the first communication device uses the beamforming matrix for the purpose of reducing interference to a second wireless network caused by the first communication device transmitting to the second communication device via the MIMO communication channel. For example, in an embodiment, the beamforming matrix comprises gain factors and phase factors, and the first communication device uses the gain factors and phase factors to modify signals to be transmitted prior to the signals being applied to multiple antennas of the first communication device.

In an embodiment, the PHY processing unit 20 is configured to apply the beamforming matrix to signals that will be transmitted via the multiple antennas of the first communication device. In an embodiment, the network interface 16 is configured to implement block 408 (e.g., the PHY processing unit 20 is configured to implement block 408, or the MAC processing unit 18 and the PHY processing unit 20 are configured to jointly implement block 408).

In some embodiments, the MIMO communication channel utilized in conjunction with the method 400 is below 6 GHz. In some embodiments, the MIMO communication channel utilized in conjunction with the method 400 is between 2 GHz and 6 GHz. In some embodiments, the MIMO communication channel utilized in conjunction with the method 400 is below 10 GHz. In some embodiments, the MIMO communication channel utilized in conjunction with the method 400 is between 1 GHz and 10 GHz.

Figure 6:
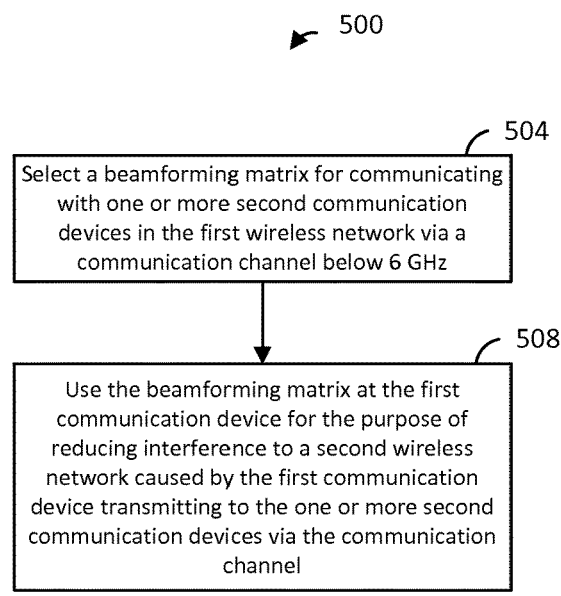
FIG. 6 is a flow diagram of an example method for reducing interference with other wireless network devices, according to an embodiment.

FIG. 6 is a flow diagram of an example method 500 for reducing interference in wireless communications. The method 500 is implemented at a first communication device that belongs to a first wireless network (e.g., a WLAN or another suitable wireless network). The method 500 is implemented by the network interface 16 of access point 14, in an embodiment, and the method 500 is discussed with reference to FIG. 1 for illustrative purposes. In other embodiments, the method 500 is implemented by another suitable communication device, e.g. by a suitable network interface device of the communication device.

At block 504, the first communication device selects a beamforming matrix for communicating with one or more second communication devices in the first wireless network via a communication channel below 6 GHz. In some embodiments, the communication channel is between 2 GHz and 6 GHz. In other embodiments, the communication channel is between 1 GHz and 10 GHz.

In some embodiments, the beamforming matrix is selected from a plurality of pre-generated beamforming matrices using techniques such as described above. In an embodiment, the plurality of pre-generated beamforming matrices includes multiple beamforming matrices corresponding to different sectors.

In an embodiment, the PHY processing unit 20 is configured to implement block 504.

At block 508, the first communication device uses the beamforming matrix for the purpose of reducing interference to a second wireless network caused by the first communication device transmitting to the one or more second communication devices via the communication channel. For example, in an embodiment, the beamforming matrix comprises gain factors and phase factors, and the first communication device uses the gain factors and phase factors to modify signals to be transmitted prior to the signals being applied to multiple antennas of the first communication device.

In an embodiment, the PHY processing unit 20 is configured to apply the beamforming matrix to signals that will be transmitted via the multiple antennas of the first communication device. In an embodiment, the network interface 16 is configured to implement block 508 (e.g., the PHY processing unit 20 is configured to implement block 508, or the MAC processing unit 18 and the PHY processing unit 20 are configured to jointly implement block 508).

Figure 7:
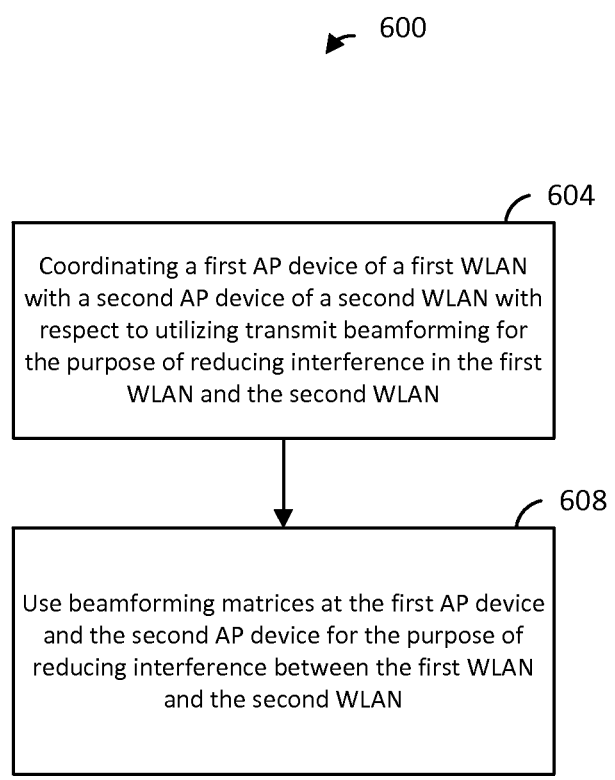
FIG. 7 is a flow diagram of another example method for reducing interference between multiple wireless communication networks, according to an embodiment.

FIG. 7 is a flow diagram of an example method 600 for reducing interference in wireless communications. The method 600 is implemented at a first AP device of a first wireless network (e.g., a WLAN or another suitable wireless network) and at a second AP device of a second network. The method 600 is implemented at least partially by the network interface 16 of access point 14 and in a network interface (not shown) of another AP device (not shown in FIG. 1), in an embodiment. For example, the first AP device of the method 600 corresponds to the AP 14 of FIG. 1, and the other AP device (not shown in FIG. 1) corresponds to the second AP device of FIG. 1. The second AP device has a same structure or a similar structure to the AP 14 of FIG. 1, in various embodiments.

At block 604, the first AP device coordinates with the second AP device with respect to utilizing transmit beamforming for the purpose of reducing interference between the first wireless communication network and the second wireless communication network. For example, in some embodiments, block 604 includes the first AP device and the second AP device synchronizing downlink transmissions of the first AP device that utilize transmit beamforming with downlink transmissions of the second AP that utilize transmit beamforming, such as described above. In some embodiments, block 604 includes coordinating the transmission of broadcast packets to sectors, such as described above with respect to FIGS. 4B and 4C.

At block 608, the first AP device and the second AP device use beamforming matrices for the purpose of reducing interference between the first wireless communication network and the second wireless communication network. In some embodiments, the first AP device and the second AP device determine the beamforming matrices based on channel estimates, such as discussed above. In some embodiments, the beamforming matrices are selected, respectively, from first and second pluralities of pre-generated beamforming matrices using techniques such as described above. In an embodiment, the first and second pluralities of pre-generated beamforming matrices each include multiple beamforming matrices corresponding to different sectors.

In some embodiments, the first AP device and the second AP device utilize a communication channel below 6 GHz. In some embodiments, the communication channel is between 2 GHz and 6 GHz. In other embodiments, the communication channel is between 1 GHz and 10 GHz.

In some embodiments, interference mitigation techniques such as described above are utilized in response to determining that transmissions from the first communication device are causing interference, in an embodiment, or are likely to cause interference, in an embodiment, to the second wireless network. For example, in an embodiment, the first communication device may detect transmissions from the second wireless network, and in response interference mitigation techniques such as described above. For example, it may be assumed that, because the first communication device detected transmissions from the second wireless network, transmissions from the first communication device are likely causing interference to the second wireless network. As another example, it may be assumed that, because the first communication device detected transmissions from the second wireless network, transmissions from the second wireless network are likely causing interference to the first wireless network and thus use of TxBF techniques in the first wireless network will improve throughput of the first wireless network.

As another example, in an embodiment, the first communication device may determine whether transmissions from a second wireless network meet a signal strength criteria (e.g., a measure of signal strength (e.g., power, RSSI, etc.) meets a threshold (e.g., exceeds the threshold, is greater than or equal to the threshold, etc.); and in response to the transmissions from the second wireless network meeting the criteria, interference mitigation techniques such as described above may be utilized. For example, it may be assumed that, because the first communication device detects transmissions from the second wireless network that meet the signal strength criteria, the second wireless network is likely near to the first communication device and transmissions from the first communication device are likely causing interference to the second wireless network. As another example, it may be assumed that, because the first communication device detects transmissions from the second wireless network that meet the signal strength criteria, transmissions from the second wireless network are likely causing interference to the first wireless network and thus use of TxBF techniques in the first wireless network will improve throughput of the first wireless network.

In some embodiments, interference mitigation techniques such as described above are utilized in response to determining that a communication device (e.g., an AP or a client) in the second wireless network is within a particular distance from the first communication device (e.g., the AP of the first wireless network). For example, in an embodiment, the first communication device may determine a location of a communication device (e.g., an AP or a client) in the second wireless network, and determine whether the location of the communication device in the second wireless network is within a particular distance from the first communication device. For example, in an embodiment, the first communication device (e.g., the AP of the first wireless network) may calculate or estimate a distance between the first communication device and the communication device in the second wireless network, and compare the distance to a threshold. If the distance meets the threshold (e.g., is less than the threshold, less than or equal to the threshold), the first communication device may utilize interference mitigation techniques such as described above. In some embodiments, the first communication device may estimate a distance between the first communication device and the device in the second wireless network based on a measure of signal strength with regard to transmissions from the device in the second wireless network.

In some embodiments, the first communication device utilizes interference mitigation techniques such as described above in response to receiving a communication (e.g., a request for the first communication device to use utilize interference mitigation techniques, a notification that the first communication device is causing interference to the second wireless network, etc.), from a device in the second wireless network. In some embodiments, the communication is received via a communication link different from communication channels used in the first wireless network and the second wireless network.

At least some of the various blocks, operations, and techniques described above may be implemented in hardware, a processor executing firmware and/or software instructions, or any combination thereof.

When implemented utilizing a processor executing software or firmware instructions, the software or firmware instructions may be stored in any non-transitory, tangible computer readable medium or media such as a magnetic disk, an optical disk, a RAM or ROM or flash memory, a memory of a processor, a hard disk drive, an optical disk drive, a tape drive, etc. The software or firmware instructions may include machine readable instructions stored on a memory or other tangible, non-transitory computer-readable storage medium that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

Further aspects of the present invention relates to one or more of the following clauses.

In one embodiment, a method for reducing interference in wireless communications comprises at least one of i) determining, at a first communication device, a beamforming matrix based on an estimate of a multiple input, multiple output (MIMO) communication channel between the first communication device and a second communication device, wherein the first communication device and the second communication device belong to a first wireless network or ii) receiving, at the first communication device, the beamforming matrix, the beamforming matrix having been generated based on the estimate of the MIMO communication channel. The method further comprises using the beamforming matrix at the first communication device for the purpose of reducing interference to a second wireless network caused by the first communication device transmitting to the second communication device via the MIMO communication channel, wherein the second wireless network omits the first communication device.

In other embodiments, the method includes any suitable combination of one or more of the following features.

Determining, at the first communication device, the estimate of the MIMO communication channel.

Determining the estimate of the MIMO communication channel includes receiving the estimate of the MIMO communication channel from the second communication device.

The MIMO communication channel is below 6 GHz and/or the MIMO communication channel is above 2 GHz.

The second wireless network omits the second communication device.

Determining, at the first communication device, that the first communication device transmitting to the second communication device via the MIMO communication channel will cause interference to the second wireless network; wherein using the beamforming matrix at the first communication device for the purpose of reducing interference to the second wireless network is performed in response to determining that the first communication device transmitting to the second communication device via the MIMO communication channel will cause interference to the second wireless network.

In another embodiment, an apparatus corresponding to a first communication device comprises a network interface including i) a media access control (MAC) processing unit, and ii) a physical layer (PHY) processing unit coupled to the MAC processing unit. The PHY processing unit is configured to at least one of i) determine a beamforming matrix based on an estimate of a multiple input, multiple output (MIMO) communication channel between the first communication device and a second communication device, wherein the first communication device and the second communication device belong to a first wireless network, or ii) receive the beamforming matrix, the beamforming matrix having been generated based on the estimate of the MIMO communication channel. Moreover, the network interface is configured to use the beamforming matrix for the purpose of reducing interference to a second wireless network caused by the first communication device transmitting to the second communication device via the MIMO communication channel, wherein the second wireless network omits the first communication device.

In other embodiments, the apparatus includes any suitable combination of one or more of the following features.

The PHY processing unit is configured to determine the estimate of the MIMO communication channel.

The PHY processing unit is configured to determine the estimate of the MIMO communication channel based on receiving the estimate of the MIMO communication channel from the second communication device.

The MIMO communication channel is below 6 GHz and/or the MIMO communication channel is above 2 GHz.

The second wireless network omits the second communication device.

The network interface is further configured to determine that the first communication device transmitting to the second communication device via the MIMO communication channel will cause interference to the second wireless network. To use the beamforming matrix at the first communication device for the purpose of reducing interference to the second wireless network is performed in response to determining that the first communication device transmitting to the second communication device via the MIMO communication channel will cause interference to the second wireless network.

In yet another embodiment, a method for reducing interference in wireless communications comprises selecting, at a first communication device, a beamforming matrix. The first communication device belongs to a first wireless network, and the first communication device communicates with one or more second communication devices in the first wireless network via a communication channel below 6 GHz. The method further comprises using the beamforming matrix at the first communication device for the purpose of reducing interference to a second wireless network caused by the first communication device transmitting to the one or more second communication devices via the communication channel, wherein the second wireless network omits the first communication device.

In other embodiments, the method includes any suitable combination of one or more of the following features.

The first communication is communicatively coupled, via a communication link separate from the first wireless network and the second wireless network, to a third communication device. Selecting the first beamforming matrix from the plurality of pre-generated beamforming matrices is performed in coordination with the third communication device and/or the third communication device belongs to the second wireless network.

The first communication device is a first access point (AP) of the first wireless network, and/or the third communication device is a second AP of the second wireless network.

The first AP coordinates with the second AP so that the first AP uses the first beamforming matrix for a first downlink transmission when the second AP is scheduled to perform a second downlink transmission, and/or the first AP coordinates with the second AP so that the first AP schedules one or more first uplink transmissions in the first wireless network at times different than when the second AP schedules one or more second uplink transmissions in the second wireless network.

Using the beamforming matrix comprises using the beamforming matrix to transmit a broadcast packet from the first communication device to multiple second communications devices.

Selecting the beamforming matrix comprises selecting, at the first communication device, the beamforming matrix from a plurality of pre-generated beamforming matrices.

The beamforming matrix is a first beamforming matrix from the plurality of pre-generated beamforming matrices. Using the first beamforming matrix comprises using the first beamforming matrix at a first time and the method further comprises selecting, at the first communication device, a second beamforming matrix from the plurality of pre-generated beamforming matrices, and using the second beamforming matrix at the first communication device at a second time for the purpose of reducing interference to the second wireless network caused by the first communication device transmitting to the one or more second communications device via the communication channel.

Using the first beamforming matrix at the first time comprises using the first beamforming matrix to transmit a broadcast packet from the first communication device, and using the second beamforming matrix at the second time comprises using the second beamforming matrix to re-transmit the broadcast packet from the first communication device.

The communication channel is above 2 GHz.

In another embodiment, an apparatus corresponding to a first communication device comprises a network interface including i) a media access control (MAC) processing unit, and ii) a physical layer (PHY) processing unit coupled to the MAC processing unit. The first communication device belongs to a first wireless network, and the first communication device communicates with one or more second communication devices in the first wireless network via a communication channel below 6 GHz. Moreover, the network interface is configured to select a beamforming matrix and use the beamforming matrix at the first communication device for the purpose of reducing interference to a second wireless network caused by the first communication device transmitting to the one or more second communication devices via the MIMO communication channel. The second wireless network omits the first communication device.

In other embodiments, the apparatus includes any suitable combination of one or more of the following features.

The first communication is communicatively coupled, via a communication link separate from the first wireless network and the second wireless network, to a third communication device and network interface is configured to select the first beamforming matrix from the plurality of pre-generated beamforming matrices is performed in coordination with the third communication device.

A system comprising the apparatus as mentioned above and the third communication device.

The first communication device is a first access point (AP) of the first wireless network, and the third communication device is communicatively coupled to a second AP of the second wireless network.

The third communication device is configured to: coordinate the first AP and the second AP so that the network interface uses the first beamforming matrix for a first downlink transmission when the second AP is scheduled to perform a second downlink transmission. The third communication device is further configured to: cause the first AP to schedule one or more first uplink transmissions in the first wireless network at times different than when the second AP schedules one or more second uplink transmissions in the second wireless network.

The first communication device is a first access point (AP) of the first wireless network, and the third communication device is a second AP of the second wireless network.

The first AP coordinates with the second AP so that the network interface uses the first beamforming matrix for a first downlink transmission when the second AP is scheduled to perform a second downlink transmission and/or the first AP coordinates with the second AP so that the first AP schedules one or more first uplink transmissions in the first wireless network at times different than when the second AP schedules one or more second uplink transmissions in the second wireless network.

The network interface is configured to use the beamforming matrix to transmit a broadcast packet from the first communication device to multiple second communications devices.

The network interface is configured to select the beamforming matrix from a plurality of pre-generated beamforming matrices.

The beamforming matrix is a first beamforming matrix from the plurality of pre-generated beamforming matrices. The network interface is configured to: use the first beamforming matrix at a first time, select a second beamforming matrix from the plurality of pre-generated beamforming matrices, and use the second beamforming matrix at the first communication device at a second time for the purpose of reducing interference to the second wireless network caused by the first communication device transmitting to the one or more second communications device via the communication channel.

The network interface is configured to: use the first beamforming matrix at the first time to transmit a broadcast packet from the first communication device, and use the second beamforming matrix at the second time to re-transmit the broadcast packet from the first communication device.

The communication channel is above 2 GHz.

In another embodiment, a method for reducing interference in a first wireless communication network and a second wireless communication network includes coordinating, at a first access point (AP) device of the first wireless communication network, with a second AP device of the second wireless communication network with respect to utilizing transmit beamforming at the first AP device and transmit beamforming at the second AP device for the purpose of reducing interference in the first wireless communication network and the second wireless communication network; and based on coordinating with the second AP device, using a beamforming matrix at the first AP device to transmit, via a multiple input, multiple output (MIMO) communication channel, to one or more first stations in the first wireless communication network for mitigating interference between the first wireless communication network and the second wireless communication network.

In other embodiments, the method includes any suitable combination of one or more of the following features.

The method further includes at least one of: i) determining, at the first AP, the beamforming matrix based on an estimate of the MIMO communication channel, wherein the MIMO communication channel is between the first AP and a particular first station in the first wireless communication network, or ii) receiving, at the first AP, the beamforming matrix, the beamforming matrix having been generated based on the estimate of the MIMO communication channel between the first AP and the particular first station.

The MIMO communication channel is below 6 GHz.

The MIMO communication channel is above 2 GHz.

Coordinating comprises: synchronizing, at the first AP, downlink transmissions of the first AP that utilize transmit beamforming with downlink transmissions of the second AP that utilize transmit beamforming.

Coordinating further comprises: determining a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and selecting, based on the determined performance metric, the particular first station for a scheduled future beamformed transmission from the first AP that overlaps in time with a future beamformed transmission from the second AP to the second station.

The method further includes selecting, at the first AP, the beamforming matrix from a plurality of pre-generated beamforming matrices.

The beamforming matrix is a first beamforming matrix from the plurality of pre-generated beamforming matrices; using the first beamforming matrix comprises using the first beamforming matrix at a first time; and the method further includes: selecting, at the first communication device, a second beamforming matrix from the plurality of pre-generated beamforming matrices, and using the second beamforming matrix at the first communication device at a second time; and coordinating comprises coordinating the first time and the second time with the second AP device for the purpose of reducing interference in the first wireless communication network and the second wireless communication network.

Using the first beamforming matrix at the first time comprises using the first beamforming matrix to transmit a broadcast packet from the first AP device; and using the second beamforming matrix at the second time comprises using the second beamforming matrix to re-transmit the broadcast packet from the first AP device.

In yet another embodiment, an apparatus corresponding to a first access point (AP) device configured to operate in a first wireless communication network comprises a network interface device including i) a media access control (MAC) processing unit, and ii) a physical layer (PHY) processing unit coupled to the MAC processing unit. The network interface device is configured to coordinate with a second AP device of a second wireless communication network with respect to utilizing transmit beamforming at the first AP device and transmit beamforming at the second AP device for the purpose of reducing interference in the first wireless communication network and the second wireless communication network, and based on coordinating with the second AP device, use a beamforming matrix to transmit, via a multiple input, multiple output (MIMO) communication channel, to one or more first stations in the first wireless communication network for mitigating interference between the first wireless communication network and the second wireless communication network.

In other embodiments, the apparatus includes any suitable combination of one or more of the following features.

The PHY processing unit is configured to at least one of: i) determine the beamforming matrix based on an estimate of the MIMO communication channel, wherein the MIMO communication channel is between the first AP and a particular first station in the first wireless communication network, or ii) receive the beamforming matrix, the beamforming matrix having been generated based on the estimate of the MIMO communication channel between the first AP and the particular first station.

The MIMO communication channel is below 6 GHz.

The MIMO communication channel is above 2 GHz.

The network interface device is further configured to: synchronize downlink transmissions of the first AP that utilize transmit beamforming with downlink transmissions of the second AP that utilize transmit beamforming.

The network interface device is further configured to: determine a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and select, based on the determined performance metric, the particular first station for a scheduled future beamformed transmission from the first AP that overlaps in time with a future beamformed transmission from the second AP to the second station.

The PHY processing device is further configured to select the beamforming matrix from a plurality of pre-generated beamforming matrices.

The beamforming matrix is a first beamforming matrix from the plurality of pre-generated beamforming matrices; the network interface device is configured to: use the first beamforming matrix at a first time, and select a second beamforming matrix from the plurality of pre-generated beamforming matrices, use the second beamforming matrix at a second time, and coordinate the first time and the second time with the second AP device for the purpose of reducing interference in the first wireless communication network and the second wireless communication network.

The network interface device is further configured to: use the first beamforming matrix at the first time comprises to transmit a broadcast packet; and use the second beamforming matrix at the second time to re-transmit the broadcast packet from the first AP device.

In still another embodiment, a system comprises a first access point (AP) device configured to operate in a first wireless communication network, the first AP device having a first network interface device; and a second AP device configured to operate in a second wireless communication network, the second AP device having a second network interface device. The first network interface device is configured to coordinate with the second AP device with respect to utilizing transmit beamforming at the first AP device and transmit beamforming at the second AP device for the purpose of reducing interference in the first wireless communication network and the second wireless communication network, and based on coordinating with the second AP device, use a first beamforming matrix to transmit, via a first multiple input, multiple output (MIMO) communication channel, to one or more first stations in the first wireless communication network for mitigating interference between the first wireless communication network and the second wireless communication network. The second network interface device is configured to coordinate with the first AP device with respect to utilizing transmit beamforming at the first AP device and transmit beamforming at the second AP device for the purpose of reducing interference in the first wireless communication network and the second wireless communication network, and based on coordinating with the first AP device, use a second beamforming matrix to transmit, via a second MIMO communication channel, to one or more second stations in the second wireless communication network for mitigating interference between the first wireless communication network and the second wireless communication network.

In other embodiments, the system includes any suitable combination of one or more of the following features.

The first network interface device and the second network interface device are further configured to: synchronize downlink transmissions of the first AP that utilize transmit beamforming with downlink transmissions of the second AP that utilize transmit beamforming.

The first network interface device is further configured to select the first beamforming matrix from a plurality of pre-generated beamforming matrices.

The first network interface device is configured to: use the first beamforming matrix at a first time, and select a third beamforming matrix from the plurality of pre-generated beamforming matrices, use the third beamforming matrix at a second time, and coordinate the first time and the second time with the second AP device for the purpose of reducing interference in the first wireless communication network and the second wireless communication network.

The first network interface device is further configured to: determine a performance metric associated with reception of a first beamformed packet transmitted from the first AP to a particular first station in the first wireless communication network, wherein transmission of the first beamformed packet overlaps in time with transmission of a second beamformed packet from the second AP to a second station in the second wireless communication network; and select, based on the determined performance metric, the particular first station for a scheduled future beamformed transmission from the first AP that overlaps in time with a future beamformed transmission from the second AP to the second station.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for reducing interference in a first wireless communication network and a second wireless communication network, the method comprising: coordinating, at a first access point (AP) device of the first wireless communication network, with a second AP device of the second wireless communication network with respect to utilizing transmit beamforming at the first AP device and transmit beamforming at the second AP device for the purpose of reducing interference in the first wireless communication network and the second wireless communication network, including determining a schedule for using, at the first AP device, beamforming matrices selected from a plurality of pre-generated beamforming matrices that correspond to respective sectors that together span a full coverage area of the first AP device;

based on coordinating with the second AP device and the schedule: using a first pre-generated beamforming matrix at the first AP device during a first time period to transmit in a first sector of the coverage area of the first AP device directed toward the second AP device using a first frequency channel while the second AP device uses a second beamforming matrix to i) transmit in a second sector of a coverage area of the second AP device directed away from the first AP device using a second frequency channel that overlaps in frequency with the first frequency channel, and ii) not transmit in any sector of the coverage area of the second AP device directed toward the first AP device, and using a third pre-generated beamforming matrix at the first AP device during a second time period to i) transmit in a third sector of the coverage area of the first AP device directed away from the second AP device using the first frequency channel, and ii) not transmit in any sector of the coverage area of the first AP device directed toward the second AP device, while the second AP device uses a fourth beamforming matrix to transmit in a fourth sector of the coverage area of the second AP device directed toward the first AP device using the second frequency channel; placing a first receiver in the first sector at a desired direction and range from the first AP device for purposes of calibrating the first beamforming matrix; placing a second receiver in the third sector at a desired direction and range from the first AP device for purposes of calibrating the third beamforming matrix; transmitting, by the first AP device and using the first frequency channel, a first training signal using the first beamforming matrix; using i) a first signal measurement of the first training signal by the first receiver in the first sector, and ii) a second signal measurement of the first training signal by the second receiver in the third sector, to adjust the first beamforming matrix such that a received signal strength in the first sector is maximized; transmitting, by the first AP device and using the first frequency channel, a second training signal using the third beamforming matrix; and using i) a first signal measurement of the second training signal by the first receiver in the first sector, and ii) a second signal measurement of the second training signal by the second receiver in the third sector, to adjust the third beamforming matrix such that a received signal strength in the third sector is maximized; wherein the first pre-generated beamforming matrix is different than the third pre-generated beamforming matrix, and the second beamforming matrix is different than the fourth beamforming matrix.

2. The method of claim 1, wherein: using the first beamforming matrix at the first time comprises using the first beamforming matrix to transmit a broadcast packet from the first AP device using the first frequency channel; and using the third beamforming matrix at the third time comprises using the third beamforming matrix to re-transmit the broadcast packet from the first AP device using the first frequency channel.

3. The method of claim 1, wherein the first signal measurement of the first training signal, the second signal measurement of the first training signal, the first signal measurement of the second training signal, and the second signal measurement of the second training signal comprise respective received signal strength measurements.

4. The method of claim 1, further comprising: reserving, at the first AP device, a first transmit opportunity period (TXOP); and reserving, at the first AP device, a second TXOP; wherein the first time period is included in the first TXOP and the second time period is included in the second TXOP.

5. The method of claim 1, wherein: the first frequency channel is below 6 GHz; and the second frequency channel is below 6 GHz.

6. The method of claim 5, wherein: the first frequency channel is above 2 GHz; and the second frequency channel is above 2 GHz.

7. The method of claim 1, further comprising, based on coordinating with the second AP device and the schedule: using a fifth pre-generated beamforming matrix at the first AP device during a third time period to transmit in a fifth sector of the coverage area of the first AP device directed away from the second AP device using the first frequency channel while the second AP device uses a sixth beamforming matrix in a sixth sector of the coverage area of the second AP device directed away the first AP device to transmit using the second frequency channel.

8. An apparatus corresponding to a first access point (AP) device configured to operate in a first wireless communication network, the apparatus comprising: a network interface device including i) a media access control (MAC) processing unit implemented using one or more integrated circuit (IC) devices, and ii) a physical layer (PHY) processing unit coupled to the MAC processing unit, the PHY processing unit implemented using one or more IC devices; wherein the one or more ICs are configured to: coordinate with a second AP device of a second wireless communication network with respect to utilizing transmit beamforming at the first AP device and transmit beamforming at the second AP device for the purpose of reducing interference in the first wireless communication network and the second wireless communication network, including determining a schedule for using, at the first AP device, beamforming matrices selected from a plurality of pre-generated beamforming matrices that correspond to respective sectors that together span a full coverage area of the first AP device; wherein the one or more ICs are further configured to, based on coordinating with the second AP device and the schedule: use a first pre-generated beamforming matrix during a first time period to transmit in a first sector of the coverage area of the first AP device directed toward the second AP device using a first frequency channel while the second AP device uses a second beamforming matrix to i) transmit in a second sector of a coverage area of the second AP device directed away from the first AP device using a second frequency channel that overlaps in frequency with the first frequency channel, and ii) not transmit in any sector of the coverage area of the second AP directed toward the first AP device, and uses a third pre-generated beamforming matrix during a second time period to i) transmit in a third sector of the coverage area of the first AP device directed away from the second AP device using the first frequency channel, and ii) not transmit in any sector of the coverage area of the first AP device directed toward the second AP device, while the second AP device uses a fourth beamforming matrix to transmit in a fourth sector of the coverage area of the second AP device directed toward the first AP device using the second frequency channel, and wherein the one or more ICs are further configured to: transmit, using the first frequency channel, a first training signal using the first beamforming matrix, use i) a first signal measurement of the first training signal by a first receiver in the first sector, and ii) a second signal measurement of the first training signal by a second receiver in the third sector, to adjust the first beamforming matrix such that a received signal strength in the first sector is maximized, transmit, using the first frequency channel, a second training signal using the third beamforming matrix, and use i) a first signal measurement of the second training signal by the first receiver in the first sector, and ii) a second signal measurement of the second training signal by the second receiver in the third sector, to adjust the third beamforming matrix such that a received signal strength in the third sector is maximized; wherein the first receiver was placed in the first sector at a desired direction and range from the first AP device for purposes of calibrating the first beamforming matrix; wherein the second receiver was placed in the third sector at a desired direction and range from the first AP device for purposes of calibrating the third beamforming matrix; and wherein the first pre-generated beamforming matrix is different than the third pre-generated beamforming matrix, and the second beamforming matrix is different than the fourth beamforming matrix.

9. The apparatus of claim 8, wherein the network interface device is configured to: use the first beamforming matrix to transmit a broadcast packet from the first AP device during the first time period using the first frequency channel; and use the third beamforming matrix to re-transmit the broadcast packet from the first AP device during the second time period using the first frequency channel.

10. The apparatus of claim 8, wherein the first signal measurement of the first training signal, the second signal measurement of the first training signal, the first signal measurement of the second training signal, and the second signal measurement of the second training signal comprise respective received signal strength measurements.

11. The apparatus of claim 8, wherein the network interface device is further configured to: reserve a first transmit opportunity period (TXOP); and reserve a second TXOP; wherein the first time period is included in the first TXOP and the second time period is included in the second TXOP.

12. The apparatus of claim 8, wherein the network interface device includes one or more transceivers configured to transmit via a communication channel below 6 GHz.

13. The apparatus of claim 12, wherein the first frequency channel is above 2 GHz.

14. A system, comprising: a first access point (AP) device configured to operate in a first wireless communication network, the first AP device having a first network interface device; a second AP device configured to operate in a second wireless communication network, the second AP device having a second network interface device; wherein the first network interface device and the second network device are configured to coordinate with respect to utilizing transmit beamforming at the first AP device and transmit beamforming at the second AP device for the purpose of reducing interference in the first wireless communication network and the second wireless communication network, including determining a schedule for using beamforming matrices at the first AP device and the second AP device; and wherein the first network device is further configured to, based on coordinating with the second AP device and the schedule: use a first pre-generated beamforming matrix during a first time period to transmit in a first sector of the coverage area of the first AP device directed toward the second AP device using a first frequency channel, wherein the first beamforming matrix is selected from a first plurality of pre-generated beamforming matrices that correspond to respective sectors that together span a full coverage area of the first AP device, use a second pre-generated beamforming matrix during a second time period to i) transmit in a second sector of the coverage area of the first AP device directed away from the second AP device using the first frequency channel, and ii) not transmit in any sectors of the coverage area of the first AP device directed toward the second AP device; wherein the first pre-generated beamforming matrix is different than the second pre-generated beamforming matrix; wherein the second network device is further configured to, based on coordinating with the first AP device and the schedule: use a third pre-generated beamforming matrix during the first time period to i) transmit in a third sector of the coverage area of the second AP device directed away from the first AP device using a second frequency channel that overlaps in frequency with the first frequency channel, and ii) not transmit in any sector of the coverage area of the second AP directed toward the first AP device, wherein the third beamforming matrix is selected from a second plurality of pre-generated beamforming matrices that correspond to respective sectors that together span a full coverage area of the second AP device, and use a fourth pre-generated beamforming matrix during the second time period to transmit in a fourth sector of the coverage area of the second AP device directed toward the first AP device using the second frequency channel; wherein the first network interface device is further configured to: transmit, using the first frequency channel, a first training signal using the first beamforming matrix, use i) a first signal measurement of the first training signal by a first receiver in the first sector, and ii) a second signal measurement of the first training signal by a second receiver in the second sector, to adjust the first beamforming matrix such that a received signal strength in the first sector is maximized, transmit using the first frequency channel, a second training signal using the second beamforming matrix, and use i) a first signal measurement of the second training signal by the first receiver in the first sector, and ii)

a second signal measurement of the second training signal by the second receiver in the second sector, to adjust the second beamforming matrix such that a received signal strength in the second sector is maximized; wherein the first receiver was placed in the first sector at a desired direction and range from the first AP device for purposes of calibrating the first beamforming matrix; wherein the second receiver was placed in the second sector at a desired direction and range from the first AP device for purposes of calibrating the second beamforming matrix; and wherein the third pre-generated beamforming matrix is different than the fourth pre-generated beamforming matrix.

15. The system of claim 14, wherein the first network interface device is configured to: use the first beamforming matrix to transmit a broadcast packet from the first AP device during the first time period using the first frequency channel; and use the second beamforming matrix to re-transmit the broadcast packet from the first AP device during the second time period using the first frequency channel.

16. The system of claim 14, wherein the first signal measurement of the first training signal, the second signal measurement of the first training signal, the first signal measurement of the second training signal, and the second signal measurement of the second training signal comprise respective received signal strength measurements.

17. The system of claim 14, wherein the first network interface device is further configured to: reserve a first transmit opportunity period (TXOP); and reserve a second TXOP; wherein the first time period is included in the first TXOP and the second time period is included in the second TXOP.

* * * * *